(12) United States Patent
Zou et al.

(10) Patent No.: US 9,654,806 B2
(45) Date of Patent: May 16, 2017

(54) DETERMINING PALETTE SIZE, PALETTE ENTRIES AND FILTERING OF PALETTE CODED BLOCKS IN VIDEO CODING

(71) Applicant: QUALCOMM Incorporated, San Diego, CA (US)

(72) Inventors: Feng Zou, San Diego, CA (US); Wei Pu, San Diego, CA (US); Rajan Laxman Joshi, San Diego, CA (US); Joel Sole Rojals, La Jolla, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 213 days.

(21) Appl. No.: 14/667,900

(22) Filed: Mar. 25, 2015

(65) Prior Publication Data
US 2015/0281703 A1    Oct. 1, 2015

Related U.S. Application Data

(60) Provisional application No. 61/970,838, filed on Mar. 26, 2014.

(51) Int. Cl.
*H04N 19/80* (2014.01)
*H04N 19/94* (2014.01)

(52) U.S. Cl.
CPC ............. *H04N 19/94* (2014.11); *H04N 19/80* (2014.11)

(58) Field of Classification Search
CPC ....................................................... H04N 19/94
See application file for complete search history.

(56) References Cited

U.S. PATENT DOCUMENTS

| 2013/0188733 A1 | 7/2013 | Van Der Auwera et al. |
| 2014/0064612 A1 | 3/2014 | Matsumura et al. |

FOREIGN PATENT DOCUMENTS

JP    2014053654 A    3/2014

OTHER PUBLICATIONS

Wiegand et al., "WD1: Working Draft 1 of High-Efficiency Video Coding", JCTVC-C403, 3rd Meeting: Guangzhou, CN, Oct. 7-15, 2010, 137 pp.
Wiegand et al., "WD2: Working Draft 2 of High-Efficiency Video Coding," JCTVC-D503, 4th Meeting: Daegu, KR, Jan. 20-28, 2011, 153 pp.

(Continued)

*Primary Examiner* — Dave Czekaj
*Assistant Examiner* — Berteau Joisil
(74) *Attorney, Agent, or Firm* — Shumaker & Sieffert, P.A.

(57) ABSTRACT

Techniques are described for palette-based coding. In palette-based coding, a video coder may form a palette as a table of colors for representing video data of a given block. Palette-based coding may be useful for coding blocks of video data having a relatively small number of colors. Rather than coding actual pixel values or their residuals for the given block, the video coder may code index values for one or more of the pixels. The index values map the pixels to entries in the palette representing the colors of the pixels. Techniques are described for determining whether to disable filtering, such as deblocking filtering or sample adaptive offset (SAO) filtering, of palette coded blocks at a video encoder or a video decoder. Techniques are also described for modify a palette size and palette entries of a palette at the video encoder based on rate-distortion costs.

29 Claims, 6 Drawing Sheets

(56) References Cited

OTHER PUBLICATIONS

Wiegand et al., "WD3: Working Draft 3 of High-Efficiency Video Coding," Document JCTVC-E603, 5th Meeting: Geneva, CH, Mar. 16-23, 2011, 193 pp.
Bross et al., "WD4: Working Draft 4 of High-Efficiency Video Coding," 6th Meeting: JCTVC-F803_d2, Torino, IT, Oct. 4, 2011, 226 pp.
Bross et al., "WD5: Working Draft 5 of High-Efficiency Video Coding," 7th Meeting: Geneva, Switzerland, Dec. 30, 2011, JCTVC-G1103_d2, 214 pp.
Bross et al., "High efficiency video coding (HEVC) text specification draft 6," 8th Meeting: San Jose, CA, USA, Feb. 1-10, 2012, JCTVC-I-11003, 259 pp.
Bross et al., "High efficiency video coding (HEVC) text specification draft 7," 9th Meeting: Geneva, CH, Apr. 37-May 7, 2012, JCTVC-I1003_d2, 290 pp.
Bross et al., "High efficiency video coding (HEVC) text specification draft 8," 10th Meeting: Stockholm, SE, Jul. 9, 2012, JCTVC-J1003_d7, 261 pp.
Bross et al., "High efficiency video coding (HEVC) text specification draft 9," 11th Meeting: Shanghai, CN, Nov. 2, 2012, JCTVC-K1003_v7, 290 pp.
Bross et al., "High efficiency video coding (HEVC) text specification draft 10 (For FDIS & Last Call)," 12th Meeting: Geneva, CH, Mar. 19, 2013, JCTVC-L1003_v34, 310 pp.
ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.
ITU-T H.265, Series H: Audiovisual and Multimedia Systems, Infrastructure of audiovisual services—Coding of moving video, Advanced video coding for generic audiovisual services, The International Telecommunication Union. Apr. 2013, 317 pp.
ITU-T H.265, Series H: Audiovisual and Multimedia Systems, Infrastructure of audiovisual services—Coding of moving video, Advanced video coding for generic audiovisual services, The International Telecommunication Union. Oct. 2014, 540 pp.
ITU-T H.265, Series H: Audiovisual and Multimedia Systems, Infrastructure of audiovisual services—Coding of moving video, Advanced video coding for generic audiovisual services, The International Telecommunication Union. Apr. 2015, 634 pp.
Chen, et al., "Description of screen content coding technology proposal by Qualcomm", JCT-VC Meeting; Valencia, (Joint Collaborative Team on Video Coding of ISO/IEC JTC1/SC29/WG11 and ITU-T 3G.16), No. JCTVC-Q0031, Mar. 18, 2014 (Mar. 18, 2014), XP030115915, 18 pp.
Pu, et al., "AHG10: Simplification of Palette Based Coding," JCT-VC Meeting; Mar. 27, 2014-Apr. 4, 2014; Valencia; (Joint Collaborative Team on Video Coding of ISO/IEC JTC1/SC29/WG11 and ITU-T SG.16); URL: http://wftp3.itu.int/av-arch/JCTVC-site/, No. JCTVC-Q0047, XP030115936, 4 pp.
Sole, et al., "Non-SCCE3: Palette and deblocking," JCT-VC Meeting; Jun. 30, 2014-Sep. 7, 2014; Sapporo; (Joint Collaborative Team on Video Coding of ISO/IEC JTC1/SC29/WG11 and ITU-T SG.16); URL: http://wftp3.itu.int/av-arch/JCTVC-site/,, No. JCTVC-R0213, XP030116509, 6 pp.
Guo, et al. "RCE4: Summary report of HEVC Range Extensions Core Experiments 4 (RCE4) on palette coding for screen content," (Joint Collaborative Team on Video Coding of ISO/IEC JTC1/SC29/WG11 and ITU-T SG.16); Document: JCTVC-P0035, Jan. 9-17, 2014, 8 pp.
Guo, et al., "RCE4: Test 1. Major-color-based screen content coding," (Joint Collaborative Team on Video Coding of ISO/IEC JTC1/SC29/WG11 and ITU-T SG.16); Document: JCTVC-P0108, Jan. 9-17, 2014, 12 pp.
Guo, et al., "RCE4: Results of Test 2 on Palette Mode for Screen Content Coding," (Joint Collaborative Team on Video Coding of ISO/IEC JTC1/SC29/WG11 and ITU-T SG.16); Document: JCTVC-P0198, Jan. 9-17, 2014, 3 pp.
International Search Report and Written Opinion from international Application No. PCT/US2015/022771, dated Jul. 17, 2015, 12 pp.
International Preliminary Report on Patentability from corresponding PCT Application Serial No. PCT/US2015/022771 dated Oct. 6, 2016 (8 pages).
Jin G., et al., "Non-RCE4: Palette Prediction for Palette Coding", 16. JCTVC Meeting; Jan. 9, 2014-Jan. 17, 2014; San Jose; (Joint Collaborative Team on Video Coding of ISO/IEC JTC1/SC29/WG11 and ITU-T SG.16); No. JCTVC-P0160-v7, Jan. 15, 2014 (Jan. 15, 2014), XP030115680, pp. 1-14.
Xiu X., et al., "Description of Screen Content Coding Technology Proposal by InterDigital", 17. JCT-VC Meeting; Mar. 27, 2014-Apr. 4, 2014; Valencia; (Joint Collaborative Team on Video Coding of ISO/IEC JTC1/SC29/WG11 and ITU-T SG.16); No. JCTVC-Q0037, Mar. 18, 2014 (Mar. 18, 2014), XP030115927, pp. 1-30.

DETERMINING PALETTE SIZE, PALETTE ENTRIES AND FILTERING OF PALETTE CODED BLOCKS IN VIDEO CODING

This application claims the benefit of U.S. Provisional Application No. 61/970,838. filed Mar. 26, 2014, the entire contents of which are incorporated herein by reference.

TECHNICAL HELD

This disclosure relates to video encoding and decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video compression techniques, such as those described in the standards defined by MPEG-2, MPEG-4, ITU-T H.263, ITU-T H.188/MPEG-4, Part 10, Advanced Video Coding (AVC), the High Efficiency Video Coding (HEVC) standard presently under development, and extensions of such standards. The video devices may transmit, receive, encode, decode, and/or store digital video information more efficiently by implementing such video compression techniques.

Video compression techniques perform spatial (intra-picture) prediction and/or temporal (inter-picture) prediction to reduce or remove redundancy inherent in video sequences. For block-based video coding, a video slice (i.e., a video frame or a portion of a video frame) may be partitioned into video blocks. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to a reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicates the difference between the coded block and the predictive block. An intra-coded block is encoded according to an intra-coding mode and the residual data. For further compression, the residual data may be transformed from the pixel domain to a transform domain, resulting in residual coefficients, which then may be quantized. The quantized coefficients, initially arranged in a two-dimensional array, may be scanned in order to produce a one-dimensional vector of coefficients, and entropy coding may be applied to achieve even more compression.

A multiview coding bitstream may be generated by encoding views, e.g., from multiple perspectives. Some three-dimensional (3D) video standards have been developed that make use of multiview coding aspects. For example, different views may transmit left and right eye views to support 3D video. Alternatively, some 3D video coding processes may apply so-called multiview plus depth coding. In multiview plus depth coding, a 3D video bitstream may contain not only texture view components, but also depth view components. For example, each view may comprise one texture view component and one depth view component.

SUMMARY

In general, this disclosure describes techniques for palette-based video coding. In palette-based coding, a video coder (e.g., a video encoder or a video decoder) may form a so-called "palette" as a table of colors for representing video data of a particular area (e.g., a given block). Palette-based coding may be especially useful for coding areas of video data having a relatively small number of colors. Rather than coding actual pixel values or their residuals for the given block, the video coder may code index values for one or more of the pixels. The index values map the pixels to entries in the palette representing the colors of the pixels. A palette may be explicitly encoded and sent to the decoder, predicted from previous palette entries, or a combination thereof. In this disclosure, techniques are described for determining whether to disable filtering, such as deblocking filtering or sample adaptive offset (SAO) filtering, of palette coded blocks at a video encoder or a video decoder. In addition, techniques are described for modifying a palette size and palette entries of a palette at the video encoder based at least in part on rate-distortion costs.

In one example, this disclosure is directed to a method of processing video data, the method comprising determining that a block of video data is a palette coded block; determining a palette for the block including one or more palette entries that indicate one or more respective color values; determining index values for one or more pixels of the block, each of the index values corresponding to one of the palette entries that indicates a color value for one of the pixels of the block; reconstructing the block of video data based on the palette and the index values for the block; and determining, based on the block being a palette coded block, to disable filtering of the reconstructed block.

In another example, this disclosure is directed to a video processing device comprising a memory configured to store video data; and one or more processors in communication with the memory. The one or more processors are configured to determine that a block of video data is a palette coded block; determine a palette for the block including one or more palette entries that indicate one or more respective color values; determine index values for one or more pixels of the block, each of the index values corresponding to one of the palette entries that indicates a color value for one of the pixels of the block; reconstruct the block of video data based on the palette and the index values for the block; and determine, based on the block being a palette coded block, to disable filtering of the reconstructed block.

In a further example, this disclosure is directed to a video processing device comprising means for determining that a block of video data is a palette coded block; means for determining a palette for the block including one or more palette entries that indicate one or more respective color values; means for determining index values for one or more pixels of the block, each of the index values corresponding to one of the palette entries that indicates a color value for one of the pixels of the block; means for reconstructing the block of video data based on the palette and the index values for the block; and means for determining, based on the block being a palette coded block, to disable filtering of the reconstructed block.

In an additional example, this disclosure is directed to a computer-readable medium having stored thereon instructions for processing video data that, when executed, cause one or more processors to determine that a block of video data is a palette coded block; determine a palette for the block including one or more palette entries that indicate one or more respective color values; determine index values for one or more pixels of the block, each of the index values corresponding to one of the palette entries that indicates a color value for one of the pixels of the block; reconstruct the block of video data based on the palette and the index values for the block; and determine, based on the block being a palette coded block, to disable filtering of the reconstructed block.

The details of one or more examples of the disclosure are set forth in the accompanying drawings and the description below. Other features, objects, and advantages will be apparent from the description, drawings, and claims.

DETAILED DESCRIPTION

Figure 1:
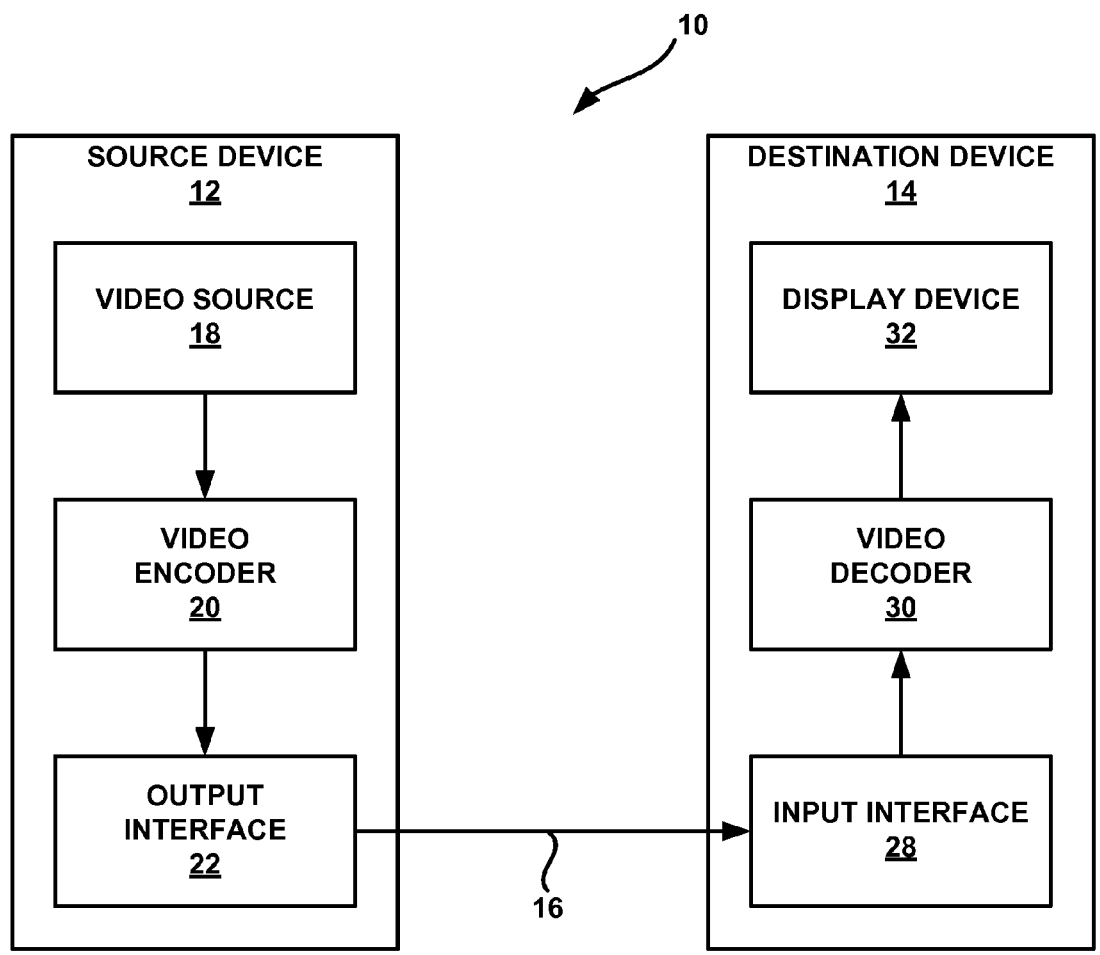
FIG. 1 is a block diagram illustrating an example video coding system that may utilize the techniques described in this disclosure.

This disclosure includes techniques for video coding and compression. In particular, this disclosure describes techniques to support coding of video content, especially screen content with palette-based coding. This disclosure describes multiple technical aspects of palette-based coding, including techniques for determining palette size, palette entries, and filtering of palette coded blocks in video coding.

In traditional video coding, images are assumed to be continuous-tone and spatially smooth. Based on these assumptions, various tools have been developed, such as block-based transform, filtering, etc., and such tools have shown good performance for coding natural content videos. In applications like remote desktop, collaborative work and wireless display, however, computer generated screen content (e.g., such as text or computer graphics) may be the dominant content to be compressed. This type of content tends to have discrete-tone, and feature sharp lines and high-contrast object boundaries. The assumptions of continuous-tone and smoothness may no longer apply for screen content, and thus traditional video coding techniques may not be efficient ways to compress video data including screen content.

This disclosure describes palette-based coding, which may be particularly suitable for screen generated content coding. For example, assuming a particular area of video data has a relatively small number of colors, a video coder (e.g., a video encoder or video decoder) may form a so-called "palette" to represent the video data of the particular area. The palette may be expressed as a table of colors representing the video data of the particular area (e.g., a given block). For example, the palette may include the most dominant colors (i.e., pixel values) in the given block. In some cases, the most dominant colors may include the one or more colors that occur most frequently within the block. Additionally, in some cases, a video coder may apply a threshold value to determine whether a color is to be included as one of the most dominant colors in the block. According to various aspects of palette-based coding, the video coder may code index values indicative of one or more of the pixels of the current block, instead of coding the actual pixel values or their residuals for the current block. In the context of palette-based coding, the index values indicate respective entries in the palette that are used to represent the colors of the individual pixels of the current block.

For example, the video encoder may encode a block of video data by determining a palette for the block, locating entries in the palette that represent colors of one or more of the pixels of the block, and encoding the block with index values that indicate the entries in the palette. For those pixels of the block with color values that map to entries in the palette, the video encoder may encode the index values of the entries for the respective pixels. For those pixels of the block with color values that do not map to entries in the palette, the video encoder may encode a special index for the pixel and encode the actual pixel value or its residual value (or a quantized version thereof). These pixels may be referred to as "escape pixels." In some examples, the video encoder may signal the palette and the index values and any escape pixels in an encoded bitstream. In turn, the video decoder may obtain, from an encoded bitstream, the palette for the block as well as index values for one or more of the pixels of the block and pixel values for any escape pixels of the block. The video decoder may map the index values to entries of the palette and decode the escape pixels to reconstruct the pixel values of the block.

The techniques for palette-based coding of video data may be used with one or more other coding techniques, such as techniques for inter- or intra-predictive coding. For example, as described in greater detail below, a video encoder or video decoder or combined encoder-decoder (codec), may be configured to perform inter- and intra-predictive coding, as well as palette-based coding.

In some examples, the palette-based coding techniques may be configured for use with one or more video coding standards. For example, High Efficiency Video Coding (HEVC) is a new video coding standard being developed by the Joint Collaboration Team on Video Coding (JCT-VC) of ITU-T Video Coding Experts Group (VCEG) and ISO/IEC Motion Picture Experts Group (MPEG). A recent HEVC text specification draft is described in Bross et al., "High Efficiency Video Coding (HEVC) text specification draft 10 (for FDIS & Last Call)," JCT-VC of ITU-T SG16 WP 3 and ISO/IEC JCT 1/SC 29/WG 11, $12^{th}$ Meeting: Geneva, CH, 14-23 Jan. 2013, JCTVC-L1003_v34 ("HEVC, Draft 10"), available from: http://phenix.int-evry.fr/jct/doc_end_user/documents/12_Geneva/wg11/ JCTVC-L1003-v34.zip. The finalized HEVC standard document is published as "ITU-T H.265, SERIES H: AUDIOVISUAL AND MULTIMEDIA SYSTEMS Infrastructure of audiovisual services—Coding of moving video—High efficiency video coding" Telecommunication Standardization Sector of international Telecommunication Union (ITU), April 2013.

With respect to the HEVC framework, as an example, the palette-based coding techniques may be configured to be used as a coding unit (CU) mode. In other examples, the palette-based coding techniques may be configured to be used as a PU mode in the framework of HEVC. Accordingly, all of the following disclosed processes described in the context of a CU mode may, additionally or alternatively, apply to PU. However, these HEVC-based examples should not be considered a restriction or limitation of the palette-based coding techniques described herein, as such techniques may be applied to work independently or as part of other existing or yet to be developed systems/standards. In these cases, the unit for palette coding can be square blocks, rectangular blocks or even regions of non-rectangular shape.

The basic idea of palette-based coding is that, for each CU, a palette is derived that includes the most dominant colors (i.e., pixel values) in the current CU. The palette size and the palette entries of the palette may be transmitted from a video encoder to a video decoder. The palette size and entries of the palette may be directly coded or predictively coded using the size and entries, respectively, of palettes for one or more neighboring CUs (e.g. above and/or left coded CUs). The pixels of the CU may then be encoded based on the palette according to a certain scanning order. For each pixel location in the CU, a flag may be transmitted to indicate whether the color of the pixel is included in the palette. For those pixels that map to an entry in the palette, a palette index associated with that entry may be signaled for the given pixel location in the CU. For those pixels with color values that do not map to entries in the palette (i.e., escape pixels), a special index may be assigned to the pixel and the actual pixel value or its residual value (or a quantized version thereof) may be transmitted for the given pixel location in the CU. The escape pixels may be coded using any existing entropy coding method such as fixed length coding, unary coding, etc.

In palette-based video coding, a video coder (e.g., a video encoder or video decoder) derives a palette for a given video block to be coded. As discussed above, the palette is derived to include the most dominant colors or pixel values in the given block. In some examples, in order to determine the most dominant colors, a histogram may be used to cluster the pixels of the given block into different groups. Using a proper algorithm to derive the palette may be considered one of the key procedures in palette-based coding. The techniques of this disclosure are directed toward improvements in the derivation of palettes for palette-based coding.

Guo et al., "RCE4: Summary report of HEVC Range Extensions Core Experiments 4 (RCE4) on palette coding for screen content," Joint Collaborative Team on Video Coding (JCT-VC) of ITU-T SG 16 WP 3 and ISO/IEC, JTC, 1/SC 29/WG 11, 16th Meeting: San José, US, 9-17 Jan. 2014, JCTVC-P0035, available from http://phenix.it-sudparis.eu/jct/doc_end_user/documents/16_San Jose/wg11/ JCTVC-P0035-v1.zip (hereinafter, "JCTVC-P0035"), describes two methods of palette-based coding reported to achieve significant Bjontegaard Distortion-rate (BD-rate) reduction, especially for screen content. The two methods are briefly summarized below.

In a first method, described in more detail in Guo et al., "RCE4: Test 1. Major-color-based screen content coding," JCT-VC of ITU-T SG 16 WP 3 and ISO/IEC JTC 1/SC 29/WG 11, 16th Meeting: San José, US, 9-17 Jan, 2014, JCTVC-P0108, available from http://phenix.int-evry.fr/jct/doc_end_user/documents/16 San Jose/wg11/ JCTVC-P0108-v1.zip (hereinafter, "JCTVC-P0108"), a histogram based algorithm is used to classify the pixels of a CU to be coded. In particular, the most significant N peak values in the histogram are selected as major colors for the CU. The pixel values that are close to one of the major colors may be quantized to the major color. The pixels that do not belong to any of the major colors are considered escape pixels, which are also quantized before coding. For lossless coding, no quantization is used.

According to the first method, by using classification, pixels of the CU may be converted into color indices. The number and values of the major colors are coded, and then the color indices area coded. For each pixel line of the CU, a flag is signaled to indicate the coding mode. There are three modes: horizontal mode, vertical mode and normal mode. If the mode is the horizontal mode, the whole pixel line of the CU shares the same color index, and the color index for each pixel line is transmitted. If the mode is the vertical mode, the whole pixel line is the same as the above pixel line. In this case, nothing is transmitted (e.g., nothing is signaled in an encoded bitstream) as the current pixel line copies the color indices of the above pixel line. If the mode is the normal mode, flag is signaled for each pixel position to indicate whether it is the same as one of the left and above pixels. If current pixel is different than the left and above pixels, the index for the current pixel is transmitted. In addition, if the current pixel is an escape pixel, the pixel value is transmitted.

In a second method, described in more detail in Guo, et al., "RCE4: Results of Test 2 on Palette Mode for Screen Content Coding," JCT-VC of ITU-T SG 16 WP 3 and ISO/IEC JTC 1/SC 29/WG 11, 16th Meeting: San José, US, 9-17 Jan. 2014, JCTVC-P0198, available from http:// phenix.int-evry.fr/jct/doc_end_user/ documents/16_San Jose/wg11/JCTVC-P0198-v3.zip (hereinafter referred to as "JCTVC-P0198"), palette-based video coding is introduced as a CU mode. The encoding process of the second method first includes transmission of a palette for a current CU. An entry-wise prediction scheme is used to encode the current palette based on the palette of a left CU (i.e., the CU neighboring the current CU currently to the left). After that, non-predicted entries of the palette are transmitted.

The encoding process of the second method also includes transmission of pixel values of the current CU. The pixels in the current CU are encoded in a raster scan order using the following three modes. In a "run mode," a palette index is first signaled, followed by a "palette_run" of length M. The following M palette indexes are the same as the signaled palette index. In the "copy above mode," a value "copy_run" of length N is transmitted to indicate that the following N palette indexes are each the same as the respective palette index in the above pixel line. In a "pixel mode," a prediction flag is first transmitted. The prediction flag equal to 1 indicates that a prediction residual is transmitted for a current pixel value using a reconstructed top neighboring pixel as the predictor. If the prediction flag is equal 0, the current pixel value is transmitted without prediction.

The techniques of this disclosure are directed toward improvements in the derivation of palettes for palette-based coding. More specifically, the techniques of this disclosure include modifying a palette size and palette entries of a palette at a video encoder, and determining whether to disable filtering of palette coded blocks at the video encoder or a video decoder.

In some examples, after the palette size and the palette entries are determined for a current block using a clustering method as described in JCTVC-P0108, the techniques of the disclosure enable the video encoder to adaptively determine the palette size and change the palette entries according to rate-distortion costs. In this way, the techniques enable modification of the palette size and palette entries that were originally determined for the palette by the clustering method. For example, the techniques include determining whether to keep or remove a given index value of the palette, determining whether to merge a given index value into a neighboring index value, and refining the calculated palette entries. Although this disclosure primarily describes the techniques for modification of the palette size and palette entries as being performed by the video encoder, in other examples the palette modification techniques may also be performed by the video decoder. In that case, for example, the video decoder may separately derive and modify the palette, or may modify the palette that is signaled by the video encoder, in accordance with the techniques of this disclosure.

In addition, the techniques enable the video encoder and the video decoder to disable filtering, such as deblocking filtering or sample adaptive offset (SAO) filtering, of palette coded blocks. Conventionally, palette coded blocks were treated the same as inter-coded blocks and, as such, filtering was automatically applied to the reconstructed blocks prior to being stored in a decoded picture buffer or output for display. According to the disclosed techniques, the video encoder and the video decoder may determine that a reconstructed block is a palette coded block and, based on that determination, disable filtering prior to storing or outputting the block. Applying filtering to palette coded blocks may not result in improved output in the same manner as inter-coded blocks (e.g., given the relatively discrete-tones usually associated with palette coding). Accordingly, the techniques of this disclosure may be used to reduce coding complexity for palette coded blocks without impacting (or having a relatively small impact) on quality.

FIG. 1 is a block diagram illustrating an example video coding system 10 that may utilize the techniques of this disclosure. As used herein, the term "video coder" refers generically to both video encoders and video decoders. In this disclosure, the terms "video coding" or "coding" may refer generically to video encoding or video decoding. Video encoder 20 and video decoder 30 of video coding system 10 represent examples of devices that may be configured to perform techniques for palette-based video coding in accordance with various examples described in this disclosure. For example, video encoder 20 and video decoder 30 may be configured to selectively code various blocks of video data, such as CUs or PUs in HEVC coding, using either palette-based coding or non-palette based coding. Non-palette based coding modes may refer to various inter-predictive temporal coding modes or intra-predictive spatial coding modes, such as the various coding modes specified by HEVC standard.

As shown in FIG. 1, video coding system 10 includes a source device 12 and a destination device 14. Source device 12 generates encoded video data. Accordingly, source device 12 may be referred to as a video encoding device or a video encoding apparatus. Destination device 14 may decode the encoded video data generated by source device 12. Accordingly, destination device 14 may be referred to as a video decoding device or a video decoding apparatus. Source device 12 and destination device 14 may be examples of video coding devices or video coding apparatuses.

Source device 12 and destination device 14 may comprise a wide range of devices, including desktop computers, wireless communication devices, mobile computing devices, notebook (e.g., laptop) computers, tablet computers, set-top boxes, telephone handsets such as so-called "smart" phones, televisions, cameras, display devices, digital media players, video gaming consoles, in-car computers, or the like.

Destination device 14 may receive encoded video data from source device 12 via a channel 16. Channel 16 may comprise one or more media or devices capable of moving the encoded video data from source device 12 to destination device 14. In one example, channel 16 may comprise one or more communication media that enable source device 12 to transmit encoded video data directly to destination device 14 in real-time. In this example, source device 12 may modulate the encoded video data according to a communication standard, such as a wireless communication protocol, and may transmit the modulated video data to destination device 14. The one or more communication media may include wireless and/or wired communication media, such as a radio frequency (RF) spectrum or one or more physical transmission lines. The one or more communication media may form part of a packet-based network, such as a local area network, a wide-area network, or a global network (e.g., the Internet). The one or more communication media may include routers, switches, base stations, or other equipment that facilitate communication from source device 12 to destination device 14.

In another example, channel 16 may include a storage medium that stores encoded video data generated by source device 12. In this example, destination device 14 may access the storage medium via disk access or card access. The storage medium may include a variety of locally-accessed data storage media such as Blu-ray discs, DVDs, CD-ROMs, flash memory, or other suitable digital storage media for storing encoded video data.

In a further example, channel 16 may include a file server or another intermediate storage device that stores encoded video data generated by source device 12. In this example, destination device 14 may access encoded video data stored at the file server or other intermediate storage device via streaming or download. The file server may be a type of server capable of storing encoded video data and transmitting the encoded video data to destination device 14. Example file servers include web servers (e.g., for a website), file transfer protocol (FTP) servers, network attached storage (NAS) devices, and local disk drives.

Destination device 14 may access the encoded video data through a standard data connection, such as an Internet connection. Example types of data connections may include wireless channels (e.g., Wi-Fi connections), wired connections (e.g., DSL, cable modem, etc.), or combinations of both that are suitable for accessing encoded video data stored on a file server. The transmission of encoded video data from the file server may be a streaming transmission, a download transmission, or a combination of both.

The techniques of this disclosure are not limited to wireless applications or settings. The techniques may be applied to video coding in support of a variety of multimedia applications, such as over-the-air television broadcasts, cable television transmissions, satellite television transmissions, streaming video transmissions, e.g., via the Internet, encoding of video data for storage on a data storage medium, decoding of video data stored on a data storage medium, or other applications. In some examples, video coding system 10 may be configured to support one-way or two-way video transmission to support applications such as video streaming, video playback, video broadcasting, and/or video telephony.

FIG. 1 is merely an example and the techniques of this disclosure may apply to video coding settings (e.g., video encoding Of video decoding) that do not necessarily include any data communication between the encoding and decoding devices. In other examples, data is retrieved from a local memory, streamed over a network, or the like. A video encoding device may encode and store data to memory, and/or a video decoding device may retrieve and decode data from memory. In many examples, the encoding and decoding is performed by devices that do not communicate with one another, but simply encode data to memory and/or retrieve and decode data from memory.

In the example of FIG. 1, source device 12 includes a video source 18, a video encoder 20, and an output interface 22. In some examples, output interface 22 may include a modulator/demodulator (modem) and/or a transmitter. Video source 18 may include a video capture device, e.g., a video camera, a video archive containing previously-captured video data, a video feed interface to receive video data from a video content provider, and/or a computer graphics system for generating video data, or a combination of such sources of video data.

Video encoder 20 may encode video data from video source 18. In some examples, source device 12 directly transmits the encoded video data to destination device 14 via output interface 22. In other examples, the encoded video data may also be stored onto a storage medium or a file server for later access by destination device 14 for decoding and/or playback.

In the example of FIG. 1, destination device 14 includes an input interface 28, a video decoder 30, and a display device 32. In some examples, input interface 28 includes a receiver and/or a modem. Input interface 28 may receive encoded video data over channel 16. Display device 32 may be integrated with or may be external to destination device 14. In general, display device 32 displays decoded video data. Display device 32 may comprise a variety of display devices, such as a liquid crystal display (LCD), a plasma display, an organic light emitting diode (OLED) display, or another type of display device.

This disclosure may generally refer to video encoder 20 "signaling" or "transmitting" certain information to another device, such as video decoder 30. The term "signaling" or "transmitting" may generally refer to the communication of syntax elements and/or other data used to decode the compressed video data. Such communication may occur in real- or near-real-time. Alternately, such communication may occur over a span of time, such as might occur when storing syntax elements to a compute-readable storage medium in an encoded bitstream at the time of encoding, which then may be retrieved by a decoding device at any time after being stored to this medium. Thus, while video decoder 30 may be referred to as "receiving" certain information, the receiving of information does not necessarily occur in real- or near-real-time and may be retrieved from a medium at some time after storage.

Video encoder 20 and video decoder 30 each may be implemented as any of a variety of suitable circuitry, such as one or more microprocessors, digital signal processors (DSPs), application-specific integrated circuits (ASICs), field-programmable gate arrays (FPGAs), discrete logic, hardware, or any combinations thereof. If the techniques are implemented partially in software, a device may store instructions for the software in a suitable, non-transitory computer-readable storage medium and may execute the instructions in hardware using one or more processors to perform the techniques of this disclosure. Any of the foregoing (including hardware, software, a combination of hardware and software, etc.) may be considered to be one or more processors. Each of video encoder 20 and video decoder 30 may be included in one or more encoders or decoders, either of which may be integrated as part of a combined encoder/decoder (CODEC) in a respective device, such as a wireless communication device.

In some examples, video encoder 20 and video decoder 30 operate according to a video compression standard, such as HEVC standard mentioned above, and described in the HEVC standard. In addition to the base HEVC standard, there are ongoing efforts to produce scalable video coding, multiview video coding, and 3D coding extensions for HEVC. In addition, palette-based coding modes, e.g., as described in this disclosure, may be provided for extension of the HEVC standard. In some examples, the techniques described in this disclosure for palette-based coding may be applied to encoders and decoders configured to operation according to other video coding standards, such as theITU-T-H.188/AVC standard or future standards. Accordingly, application of a palette-based coding mode for coding of coding units (CUs) or prediction units (PUs) in an HEVC codec is described for purposes of example.

In HEVC and other video coding standards, a video sequence typically includes a series of pictures. Pictures may also be referred to as "frames." A picture may include three sample arrays, denoted $S_L$, $S_{Cb}$ and $S_{Cr}$. $S_L$ is a two-dimensional array (i.e., a block) of luma samples. $S_{Cb}$ is a two-dimensional array of Cb chrominance samples. $S_{Cr}$ is a two-dimensional array of Cr chrominance samples. Chrominance samples may also be referred to herein as "chroma" samples. In other instances, a picture may be monochrome and may only include an array of luma samples.

To generate an encoded representation of a picture, video encoder 20 may generate a set of coding tree units (CTUs). Each of the CTUs may be a coding tree block of luma samples, two corresponding coding tree blocks of chroma samples, and syntax structures used to code the samples of the coding tree blocks. A coding tree block may be an N×N block of samples. A CTU may also be referred to as a "tree block" or a "largest coding unit" (LCU). The CTUs of HEVC may be broadly analogous to the macroblocks of other standards, such as H.188/AVC. However, a CTU is not necessarily limited to a particular size and may include one or more coding units (CUs). A slice may include an integer number of CTUs ordered consecutively in the raster scan.

To generate a coded CTU, video encoder 20 may recursively perform quad-tree partitioning on the coding tree blocks of a CTU to divide the coding tree blocks into coding blocks, hence the name "coding tree units." A coding block is an N×N block of samples. A CU may be a coding block of luma samples and two corresponding coding blocks of chrome samples of a picture that has a luma sample array, a Cb sample array and a Cr sample array, and syntax structures used to code the samples of the coding blocks. Video encoder 20 may partition a coding block of a CU into one or more prediction blocks. A prediction block may be a rectangular (i.e., square or non-square) block of samples on which the same prediction is applied. A prediction unit (PU) of a CU may be a prediction block of luma samples, two corresponding prediction blocks of chroma samples of a picture, and syntax structures used to predict the prediction block samples. Video encoder 20 may generate predictive luma, Cb and Cr blocks for luma, Cb and Cr prediction blocks of each PU of the CU.

Video encoder 20 may use intra prediction or inter prediction to generate the predictive blocks for a PU. If video encoder 20 uses intra prediction to generate the predictive blocks of a PU, video encoder 20 may generate the predictive blocks of the PU based on decoded samples of the picture associated with the PU.

If video encoder 20 uses inter prediction to generate the predictive blocks of a PU, video encoder 20 may generate the predictive blocks of the PU based on decoded samples of one or more pictures other than the picture associated with the PU. Video encoder 20 may use uni-prediction or bi-prediction to generate the predictive blocks of a PU. When video encoder 20 uses uni-prediction to generate the predictive blocks for a PU, the PU may have a single MV. When video encoder 20 uses bi-prediction to generate the predictive blocks for a PU, the PU may have two MVs.

After video encoder 20 generates predictive luma, Cb and Cr blocks for one or more PUs of a CU, video encoder 20 may generate a luma residual block for the CU. Each sample in the CU's luma residual block indicates a difference between a luma sample in one of the CU's predictive luma blocks and a corresponding sample in the CU's original luma coding block. In addition, video encoder 20 may generate a Cb residual block for the CU. Each sample in the CU's Cb residual block may indicate a difference between a Cb sample in one of the CU's predictive Cb blocks and a corresponding sample in the CU's original Cb coding block. Video encoder 20 may also generate a Cr residual block for the CU. Each sample in the CU's Cr residual block may indicate a difference between a Cr sample in one of the CU's predictive Cr blocks and a corresponding sample in the CU's original Cr coding block.

Furthermore, video encoder 20 may use quad-tree partitioning to decompose the luma, Cb and Cr residual blocks of a CU into one or more luma. Cb and Cr transform blocks. A transform block may be a rectangular block of samples on which the same transform is applied. A transform unit (TU) of a CU may be a transform block of luma samples, two corresponding transform blocks of chroma samples, and syntax structures used to transform the transform block samples. Thus, each TU of a CU may be associated with a luma transform block, a Cb transform block, and a Cr transform block. The luma transform block associated with the TU may be a sub-block of the CU's luma residual block. The Cb transform block may be a sub-block of the CU's Cb residual block. The Cr transform block may be a sub-block of the CU's Cr residual block.

Video encoder 20 may apply one or more transforms to a luma transform block of a TU to generate a luma coefficient block for the TU. A coefficient block may be a two-dimensional array of transform coefficients. A transform coefficient may be a scalar quantity. Video encoder 20 may apply one or more transforms to a Cb transform block of a TU to generate a Cb coefficient block for the TU. Video encoder 20 may apply one or more transforms to a Cr transform block of a TU to generate a Cr coefficient block for the TU.

After generating a coefficient block (e.g., a luma coefficient block, a Cb coefficient block or a Cr coefficient block), video encoder 20 may quantize the coefficient block. Quantization generally refers to a process in which transform coefficients are quantized to possibly reduce the amount of data used to represent the transform coefficients, providing further compression. After video encoder 20 quantizes a coefficient block, video encoder 20 may entropy encoding syntax elements indicating the quantized transform coefficients. For example, video encoder 20 may perform Context-Adaptive Binary Arithmetic Coding (CABAC) on the syntax elements indicating the quantized transform coefficients. Video encoder 20 may output the entropy-encoded syntax elements in a bitstream.

Video encoder 20 may output a bitstream that includes the entropy-encoded syntax elements. The bitstream may include a sequence of bits that forms a representation of coded pictures and associated data. The bitstream may comprise a sequence of network abstraction layer (NAL) units. Each of the NAL units includes a NAL unit header and encapsulates a raw byte sequence payload (RBSP). The NAL unit header may include a syntax element that indicates a NAL unit type code. The NAL unit type code specified by the NAL unit header of a NAL unit indicates the type of the NAL unit. A RBSP may be a syntax structure containing an integer number of bytes that is encapsulated within a NAL unit. In some instances, an RBSP includes zero bits.

Different types of NAL units may encapsulate different types of RBSPs, For example, a first type of NAL unit may encapsulate an RBSP for a picture parameter set (PPS), a second type of NAL unit may encapsulate an RBSP for a coded slice, a third type of NAL unit may encapsulate an RBSP for SEI, and so on. NAL units that encapsulate RBSPs for video coding data (as opposed to RBSPs for parameter sets and SEI messages) may be referred to as video coding layer (VCL) NAL units.

Video decoder 30 may receive a bitstream generated by video encoder 20. In addition, video decoder 30 may parse the bitstream to decode syntax elements from the bitstream. Video decoder 30 may reconstruct the pictures of the video data based at least in part on the syntax elements decoded from the bitstream. The process to reconstruct the video data may be generally reciprocal to the process performed by video encoder 20.

For instance, video decoder 30 may use MVs of PUs to determine predictive sample blocks for the PUs of a current CU. In addition, video decoder 30 may inverse quantize transform coefficient blocks associated with TUs of the current CU. Video decoder 30 may perform inverse transforms on the transform coefficient blocks to reconstruct transform blocks associated with the TUs of the current CU. Video decoder 30 may reconstruct the coding blocks of the current CU by adding the samples of the predictive sample blocks for PUs of the current CU to corresponding samples of the transform blocks of the TUs of the current CU. By reconstructing the coding blocks for each CU of a picture, video decoder 30 may reconstruct the picture.

In some examples, video encoder 20 and video decoder 30 may be configured to perform palette-based coding. For example, in palette based coding, rather than performing the intra-predictive or inter-predictive coding techniques described above, video encoder 20 and video decoder 30 may code a so-called palette as a table of colors for representing the video data of the particular area (e.g., a given block). Each pixel may be associated with an entry in the palette that represents the color of the pixel. For example, video encoder 20 and video decoder 30 may code an index that relates the pixel value to the appropriate value in the palette.

In the example above, video encoder 20 may encode a block of video data by determining a palette for the block, locating an entry in the palette to represent the value of each pixel, and encoding the palette with index values for the pixels relating the pixel value to the palette. Video decoder 30 may obtain, from an encoded bitstream, a palette for a block, as well as index values for the pixels of the block. Video decoder 30 may relate the index values of the pixels to entries of the palette to reconstruct the pixel values of the block.

In some examples, video encoder 20 may encode one or more syntax elements indicating a number of consecutive pixels in a given scan order that have the same pixel value. The string of like-valued pixel values may be referred to herein as a "run." In an example for purposes of illustration, if two consecutive pixels in a given scan order have different values, the run is equal to zero. If two consecutive pixels in a given scan order have the same value but the third pixel in the scan order has a different value, the run is equal to one. Video decoder 30 may obtain the syntax elements indicating a run from an encoded bitstream and use the data to determine the number of consecutive pixel locations that have the same index value.

In some examples, video encoder 20 and video decoder 30 may perform line copying for one or more entries of a map of index values. For example, video encoder 20 may indicate that a pixel value for a particular entry in an index map is equal to an entry in a line above the particular entry. Video encoder 20 may also indicate, as a run, the number of indices in the scan order that are equal to the entry in the line above of the particular entry. In this example, video encoder 20 and or video decoder 30 may copy index values from the specified neighboring line and from the specified number of entries for the line of the map currently being coded.

According to the techniques of this disclosure, video encoder 20 and video decoder 30 may determine whether or not to disable filtering of a reconstructed block based on whether the reconstructed block is a palette coded block. In addition, video encoder 20 may derive a palette for a palette coded block, and determine whether to modify at least one of a palette size or one or more palette entries of the palette based at least in part on rate-distortion costs. In particular, in some examples, video encoder 20 and video decoder 30 may be configured to perform techniques of this disclosure that are described in more detail below with respect to FIGS. 4-6.

Figure 2:
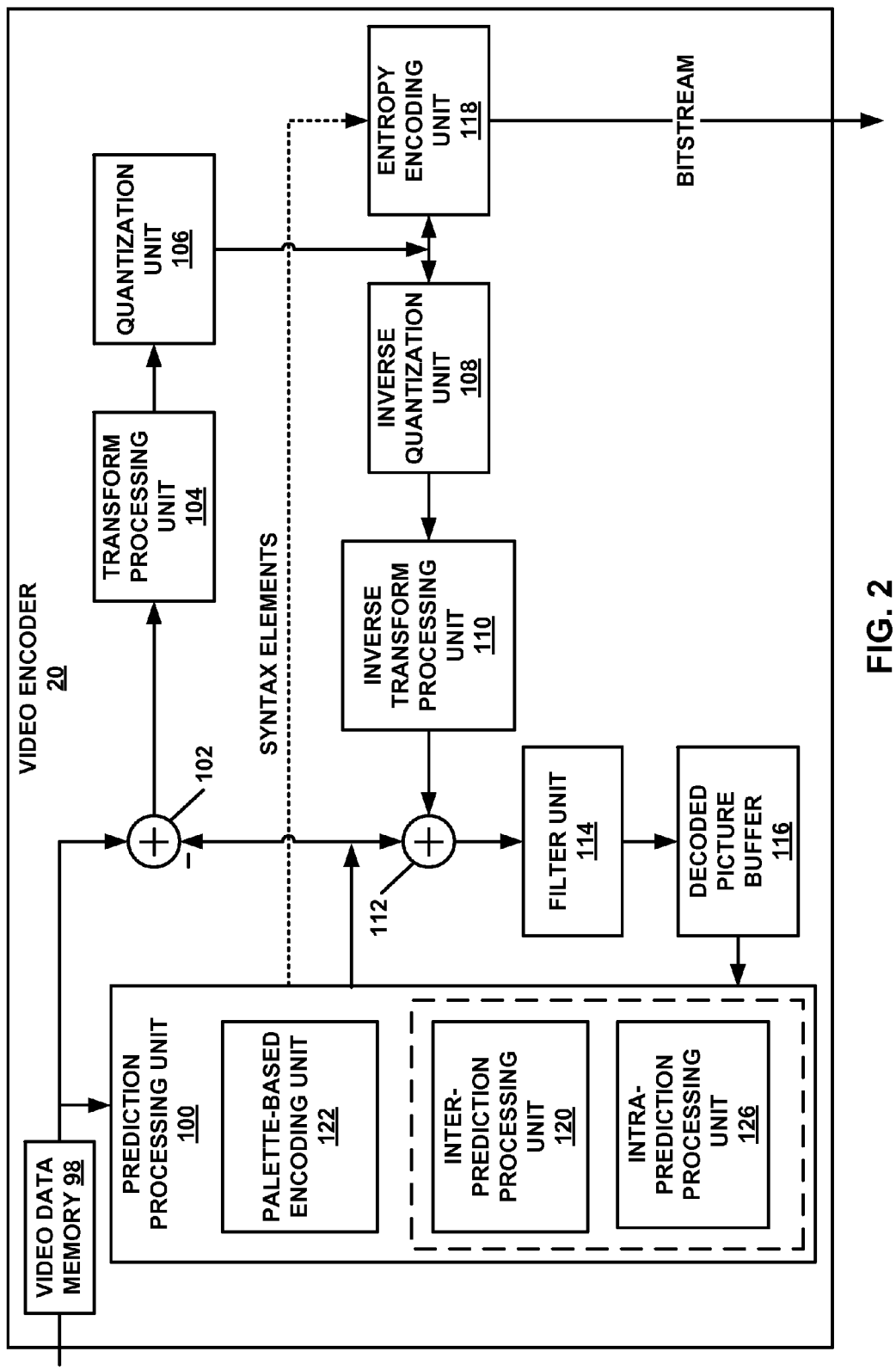
FIG. 2 is a block diagram illustrating an example video encoder that may implement the techniques described in this disclosure.

FIG. 2 is a block diagram illustrating an example video encoder 20 that may implement the techniques of this disclosure. FIG. 2 is provided for purposes of explanation and should not be considered limiting of the techniques as broadly exemplified and described in this disclosure. For purposes of explanation, this disclosure describes video encoder 20 in the context of HEVC coding. However, the techniques of this disclosure may be applicable to other coding standards or methods.

Video encoder 20 represents an example of a device that may be configured to perform techniques for palette-based video coding in accordance with various examples described in this disclosure. For example, video encoder 20 may be configured to selectively code various blocks of video data, such as CUs or PUs in HEVC coding, using either palette-based coding or non-palette based coding. Non-palette based coding modes may refer to various inter-predictive temporal coding modes or intra-predictive spatial coding modes, such as the various coding modes specified by the HEVC standard. Video encoder 20, in one example, may be configured to generate a palette having entries indicating pixel values, select pixel values in a palette to represent pixels values of at least some positions of a block of video data, and signal information associating at least some of the positions of the block of video data with entries in the palette corresponding, respectively, to the selected pixel values. The signaled information may be used by video decoder 30 to decode video data.

In the example of FIG. 2, video encoder 20 includes a video data memory 98, a prediction processing unit 100, a residual generation unit 102, a transform processing unit 104, a quantization unit 106, an inverse quantization unit 108, an inverse transform processing unit 110, a reconstruction unit 112, a filler unit 114, a decoded picture buffer 116, and an entropy encoding unit 118. Prediction processing unit 100 includes an inter-prediction processing unit 120 and an intra-prediction processing unit 126. Inter-prediction processing unit 120 includes a motion estimation unit and a motion compensation unit (not shown). Video encoder 20 also includes a palette-based encoding unit 122 configured to perform various aspects of the palette-based coding techniques described in this disclosure. In other examples, video encoder 20 may include more, fewer, or different functional components.

Video data memory 98 may store video data to be encoded by the components of video encoder 20. The video data stored in video data memory 98 may be obtained, for example, from video source 18. Decoded picture buffer 116 may be a reference picture memory that stores reference video data for use in encoding video data by video encoder 20, e.g., in intra- or inter-coding modes. Video data memory 98 and decoded picture buffer 116 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 98 and decoded picture buffer 116 may be provided by the same memory device or separate memory devices. In various examples, video data memory 98 may be on-chip with other components of video encoder 20, or off-chip relative to those components.

Video encoder 20 may receive video data. Video encoder 20 may encode each CTU in a slice of a picture of the video data. Each of the CTUs may be associated with equally-sized luma coding tree blocks (CTBs) and corresponding CTBs of the picture. As part of encoding a CTU, prediction processing unit 100 may perform quad-tree partitioning to divide the CTBs of the CTU into progressively-smaller blocks. The smaller block may be coding blocks of CUs. For example, prediction processing unit 100 may partition a CTB associated with a CTU into four equally-sized sub-blocks, partition one or more of the sub-blocks into four equally-sized sub-sub-blocks, and so on.

Video encoder 20 may encode CUs of a CTU to generate encoded representations of the CUs (i.e., coded CUs). As part of encoding a CU, prediction processing unit 100 may partition the coding blocks associated with the CU among one or more PUs of the CU. Thus, each PU may be associated with a luma prediction block and corresponding chroma prediction blocks. Video encoder 20 and video decoder 30 may support PUs having various sizes. As indicated above, the size of a CU may refer to the size of the luma coding block of the CU and the size of a PU may refer to the size of a luma prediction block of the PU. Assuming that the size of a particular CU is 2N×2N, video encoder 20 and video decoder 30 may support PU sizes of 2N×2N or N×N for intra prediction, and symmetric PU sizes of 2N×2N, 2N×N, N×2N, N×N, or similar for inter prediction. Video encoder 20 and video decoder 30 may also support asymmetric partitioning for PU sizes of 2N×nU, 2N×nD, nL×2N, and nR×2N for inter prediction.

Inter-prediction processing unit 120 may generate predictive data for a PU by performing inter prediction on each PU of a CU. The predictive data for the PU may include a predictive sample blocks of the PU and motion information for the PU. Inter-prediction unit 121 may perform different operations for a PU of a CU depending on whether the PU is in an I slice, a P slice, or a B slice. In an I slice, all PUs are intra predicted. Hence, if the PU is in an I slice, inter-prediction unit 121 does not perform inter prediction on the PU. Thus, for blocks encoded in I-mode, the predicted block is formed using spatial prediction from previously-encoded neighboring blocks within the same frame.

If a PU is in a P slice, the motion estimation unit of inter-prediction processing unit 120 may search the reference pictures in a list of reference pictures (e.g., "RefPicList0") for a reference region for the PU. The reference region for the PU may be a region, within a reference picture, that contains sample blocks that most closely corresponds to the sample blocks of the PU. The motion estimation unit may generate a reference index that indicates a position in RefPicList0 of the reference picture containing the reference region for the PU. In addition, the motion estimation unit may generate an MV that indicates a spatial displacement between a coding block of the PU and a reference location associated with the reference region. For instance, the MV may be a two-dimensional vector that provides an offset from the coordinates in the current decoded picture to coordinates in a reference picture. The motion estimation unit may output the reference index and the MV as the motion information of the PL. The motion compensation unit of inter-prediction processing unit 120 may generate the predictive sample blocks of the PU based on actual or interpolated samples at the reference location indicated by the motion vector of the PU.

If a PU is in a B slice, the motion estimation unit may perform uni-prediction or bi-prediction for the PU. To perform uni-prediction for the PU, the motion estimation unit may search the reference pictures of RefPicList0 or a second reference picture list ("RefPicList1") for a reference region for the PU. The motion estimation unit may output, as the motion information of the PU, a reference index that indicates a position in RefPicList0 or RefPicList1 of the reference picture that contains the reference region, an MV that indicates a spatial displacement between a sample block of the PU and a reference location associated with the reference region, and one or more prediction direction indicators that indicate whether the reference picture is in RefPicList0 or RefPicList1. The motion compensation unit of inter-prediction processing unit 120 may generate the predictive sample blocks of the PU based at least in part on actual or interpolated samples at the reference region indicated by the motion vector of the PU.

To perform bi-directional inter prediction for a PU, the motion estimation unit may search the reference pictures in RefPicList0 for a reference region for the PU and may also search the reference pictures in RefPicList1 for another reference region for the PU. The motion estimation unit may generate reference picture indexes that indicate positions RefPicList0 and RefPicList1 of the reference pictures that contain the reference regions. In addition, the motion estimation unit may generate MVs that indicate spatial displacements between the reference location associated with the reference regions and a sample block of the PU. The motion information of the PU may include the reference indexes and the MVs of the PU. The motion compensation unit may generate the predictive sample blocks of the PU based at least in part on actual or interpolated samples at the reference region indicated by the motion vector of the PU.

Intra-prediction processing unit 126 may generate predictive data for a PU by performing intra prediction on the PU. The predictive data for the PU may include predictive sample blocks for the PU and various syntax elements. Intra-prediction processing unit 126 may perform intra prediction on PUs in I slices, P slices, and B slices.

To perform intra prediction on a PU, intra-prediction processing unit 126 may use multiple intra prediction modes to generate multiple sets of predictive data for the PU. To use an intra prediction mode to generate a set of predictive data for the PU, intra-prediction processing unit 126 may extend samples from sample blocks of neighboring PUs across the sample blocks of the PU in a direction associated with the intra prediction mode. The neighboring PUs may be above, above and to the right, above and to the left, or to the left of the PU, assuming a left-to-right, top-to-bottom encoding order for PUs, CUs, and CTUs. Intra-prediction processing unit 126 may use various numbers of intra prediction modes, e.g., 33 directional intra prediction modes. In some examples, the number of intra prediction modes may depend on the size of the region associated with the PU.

Prediction processing unit 100 may select the predictive data for PUs of a CU from among the predictive data generated by inter-prediction processing unit 120 for the PUs or the predictive data generated by intra-prediction processing unit 126 for the PUs. In some examples, prediction processing unit 100 selects the predictive data for the PUs of the CU based on rate/distortion metrics of the sets of predictive data. The predictive sample blocks of the selected predictive data may be referred to herein as the selected predictive sample blocks.

Residual generation unit 102 may generate, based on the luma, Cb and Cr coding block of a CU and the selected predictive luma, Cb and Cr blocks of the PUs of the CU, a luma, Cb and Cr residual blocks of the CU. For instance, residual generation unit 102 may generate the residual blocks of the CU such that each sample in the residual blocks has a value equal to a difference between a sample in a coding block of the CU and a corresponding sample in a corresponding selected predictive sample block of a PU of the CU.

Transform processing unit 104 may perform quad-tree partitioning to partition the residual blocks associated with a CU into transform blocks associated with TUs of the CU. Thus, a TU may be associated with a luma transform block and two chroma transform blocks. The sizes and positions of the luma and chroma transform blocks of TUs of a CU may or may not be based on the sizes and positions of prediction blocks of the PUs of the CU. A quad-tree structure known as a "residual quad-tree" (RQT) may include nodes associated with each of the regions. The TUs of a CU may correspond to leaf nodes of the RQT.

Transform processing unit 104 may generate transform coefficient blocks for each TU of a CU by applying one or more transforms to the transform blocks of the TU. Transform processing unit 104 may apply various transforms to a transform block associated with a TU. For example, transform processing unit 104 may apply a discrete cosine transform (DCT), a directional transform, or a conceptually similar transform to a transform block. In some examples, transform processing unit 104 does not apply transforms to a transform block. In such examples, the transform block may be treated as a transform coefficient block.

Quantization unit 106 may quantize the transform coefficients in a coefficient block. The quantization process may reduce the bit depth associated with some or all of the transform coefficients. For example, an n-bit transform coefficient may be rounded down to an m-bit transform coefficient during quantization, where n is greater than m. Quantization unit 106 may quantize a coefficient block associated with a TU of a CU based on a quantization parameter (QP) value associated with the CU. Video encoder 20 may adjust the degree of quantization applied to the coefficient blocks associated with a CU by adjusting the QP value associated with the CU. Quantization may introduce loss of information, thus quantized transform coefficients may have lower precision than the original ones.

Inverse quantization unit 108 and inverse transform processing unit 110 may apply inverse quantization and inverse transforms to a coefficient block, respectively, to reconstruct a residual block from the coefficient block. Reconstruction unit 112 may add the reconstructed residual block to corresponding samples from one or more predictive sample blocks generated by prediction processing unit 100 to produce a reconstructed transform block associated with a TU. By reconstructing transform blocks for each TU of a CU in this way, video encoder 20 may reconstruct the coding blocks of the CU.

Filter unit 114 may perform one or more deblocking operations to reduce blocking artifacts in the coding blocks associated with a CU. Decoded picture buffer 116 may store the reconstructed coding blocks after filter unit 114 performs the one or more deblocking operations on the reconstructed coding blocks. Inter-prediction unit 120 may use a reference picture that contains the reconstructed coding blocks to perform inter prediction on PUs of other pictures. In addition, intra-prediction processing unit 126 may use reconstructed coding blocks in decoded picture buffer 116 to perform intra prediction on other PUs in the same picture as the CU.

Entropy encoding unit 118 may receive data from other functional components of video encoder 20. For example, entropy encoding unit 118 may receive coefficient blocks from quantization unit 106 and may receive syntax elements from prediction processing unit 100. Entropy encoding unit 118 may perform one or more entropy encoding operations on the data to generate entropy-encoded data. For example, entropy encoding unit 118 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. Video encoder 20 may output a bitstream that includes entropy-encoded data generated by entropy encoding unit 118. For instance, the bitstream may include data that represents a RQT for a CU.

In accordance with various examples of this disclosure, video encoder 20 may be configured to perform palette-based coding. With respect to the HEVC framework, as an example, the palette-based coding techniques may be configured to be used as a coding unit (CU) mode. In other examples, the palette-based coding techniques may be configured to be used as a PU mode in the framework of HEVC. Accordingly, all of the disclosed processes described herein (throughout this disclosure) in the context of a CU mode may, additionally or alternatively, apply to PU. However, these HEVC-based examples should not be considered a restriction or limitation of the palette-based coding techniques described herein, as such techniques may be applied to work independently or as part of other existing or yet to be developed systems/standards. In these cases, the unit for palette coding can be square blocks, rectangular blocks or even regions of non-rectangular shape.

Palette-based encoding unit 122, for example, may perform palette-based encoding when a palette-based encoding mode is selected, e.g., for a CU or PU. For example, palette-based encoding unit 122 may be configured to generate a palette having entries indicating pixel values, select pixel values in a palette to represent pixels cues of at least some positions of a block of video data, and signal information associating at least some of the positions of the block of video data with entries in the palette corresponding, respectively, to the selected pixel values. Although various functions are described as being performed by palette-based encoding unit 122, some or all of such functions may be performed by other processing units, or a combination of different processing units.

According to some aspects of this disclosure, palette-based encoding unit 122 may be configured to derive a palette for a palette coded block, and determine whether to modify at least one of a palette size or one or more palette entries of the palette based at least in part on rate-distortion costs. For example, after the palette entries and palette size are determined for a current block using a pixel value clustering method, described in more detail below with respect to FIG. 4, palette-based encoding unit 122 determines whether to reduce the palette size of the palette originally determined by the pixel value clustering method. In one example, palette-based encoding unit 122 determines whether to keep or remove a given index value based on a comparison of rate-distortion costs for encoding a pixel using the given index value or encoding the pixel as an escape pixel, including encoding a quantized pixel value of the pixel. In another example, palette-based encoding unit 122 determines whether to merge a given index value into a neighboring index value (e.g., combine the index values to form a single index value) based on a comparison of rate-distortion costs for encoding a pixel using the given index value or encoding the pixel using the neighboring index value.

As another example, palette-based encoding unit 122 determines whether to modify one or more of the palette entries of the palette originally determined by the pixel value clustering method. In this example, palette-based encoding unit 122 determines a representative palette for the palette coded block using a k-means clustering method, which is described in more detail with respect to FIG. 4 below. The representative palette includes representative palette entries indicating average pixel values for pixels of the block. Palette-based encoding unit 122 determines whether to modify a given palette entry of the original palette based on an average pixel value indicated by a corresponding representative palette entry of the representative palette.

The techniques for determining a palette size and palette entries of a palette for palette coded blocks are described in more detail below with respect to FIGS. 4 and 6. Although this disclosure primarily describes the techniques for modification of the palette size and palette entries as being performed by a video encoder, in other examples the palette modification techniques may also be performed by a video decoder, such as video decoder 30. In that case, for example, video decoder 30 may separately derive and modify the palette, or may modify the palette that is signaled by video encoder 20, in accordance with the techniques of this disclosure.

According to other aspects of this disclosure, video encoder 20 may be configured to determining whether to disable filtering of reconstructed palette coded blocks by filter unit 114 prior to storing the reconstructed blocks in decoded picture buffer 116. For example, video encoder 20 may disable deblocking filtering and/or SAO filtering of palette coded blocks by filter unit 114. Conventionally, palette coded blocks were treated the same as inter-coded blocks and, as such, filtering was automatically applied to the reconstructed blocks prior to being stored in a decoded picture buffer or output for display. According to the disclosed techniques, video encoder 20 may determine that a reconstructed block is a palette coded block and, based on that determination, disable filtering by filter unit 114 prior to storing the block in decoded picture buffer 116. The techniques for determining filtering of palette coded blocks are described in more detail below with respect to FIGS. 4 and 5.

Figure 3:
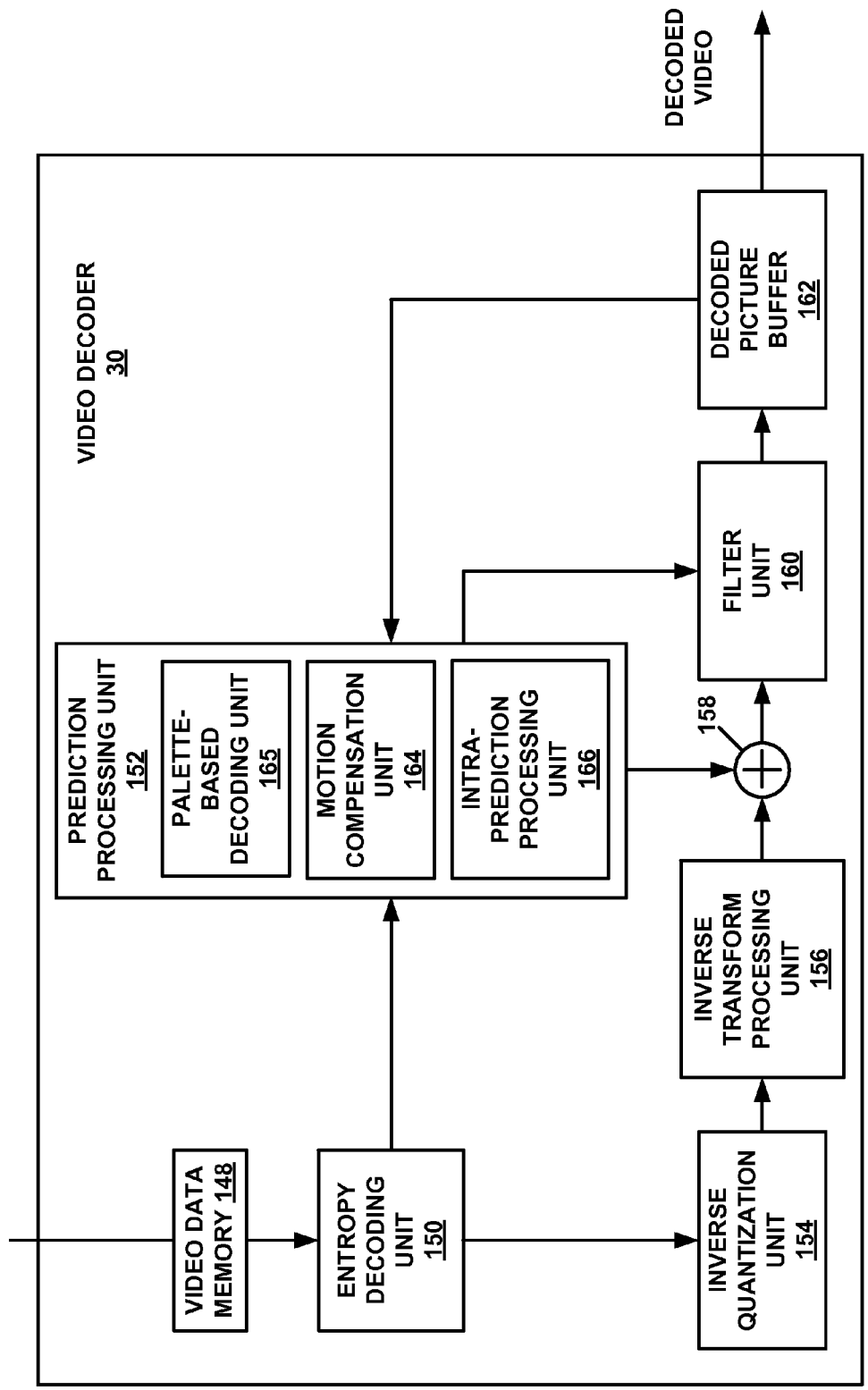
FIG. 3 is a block diagram illustrating an example video decoder that implement the techniques described in this disclosure.

FIG. 3 is a block diagram illustrating an example video decoder 30 that is configured to implement the techniques of this disclosure. FIG. 3 is provided for purposes of explanation and is not limiting on the techniques as broadly exemplified and described in this disclosure. For purposes of explanation, this disclosure describes video decoder 30 in the context of HEVC coding. However, the techniques of this disclosure may be applicable to other coding standards or methods.

Video decoder 30 represents an example of a device that may be configured to perform techniques for palette-based video coding in accordance with various examples described in this disclosure. For example, video decoder 30 may be configured to selectively decode various blocks of video data, such as CUs or PUs in HEVC coding, using either palette-based coding or non-palette based coding. Non-palette based coding modes may refer to various inter-predictive temporal coding modes or intra-predictive spatial coding modes, such as the various coding modes specified by the HEVC standard. Video decoder 30, in one example, may be configured to generate a palette having entries indicating pixel values, receive information associating at least some positions of a block of video data with entries in the palette, select pixel values in the palette based on the information, and reconstruct pixel values of the block based on the selected pixel values.

In the example of FIG. 3, video decoder 30 includes a video data memory 148, an entropy decoding unit 150, a prediction processing unit 152, an inverse quantization unit 154, an inverse transform processing unit 156, a reconstruction unit 158, a filter unit 160, and a decoded picture buffer 162. Prediction processing unit 152 includes a motion compensation unit 164 and an intra-prediction processing unit 166. Video decoder 30 also includes a palette-based decoding unit 165 configured to perform various aspects of the palette-based coding techniques described in this disclosure. In other examples, video decoder 30 may include more, fewer, or different functional components.

Video data memory 148 may store video data, such as an encoded video bitstream, to be decoded by the components of video decoder 30. The video data stored in video data memory 148 may be obtained, for example, from computer-readable medium 16, e.g., from a local video source, such as a camera, via wired or wireless network communication of video data, or by accessing physical data storage media. Video data memory 148 may form a coded picture buffer (CPB) that stores encoded video data from an encoded video bitstream. Decoded picture buffer 162 may be a reference picture memory that stores reference video data for use in decoding video data by video decoder 30, e.g., intra- or inter-coding modes. Video data memory 148 and decoded picture buffer 162 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 148 and decoded picture buffer 162 may be provided by the same memory device or separate memory devices. In various examples, video data memory 148 may be on-chip with other components of video decoder 30, or off-chip relative to those components.

Video data memory 148, i.e., a CPB, may receive and store encoded video data (e.g., NAL units) of a bitstream. Entropy decoding unit 150 may receive encoded video data (e.g., NAL units) from video data memory 148 and may parse the NAL units to decode syntax elements. Entropy decoding unit 150 may entropy decode entropy-encoded syntax elements in the NAL units. Prediction processing unit 152, inverse quantization unit 154, inverse transform processing unit 156, reconstruction unit 158, and filter unit 160 may generate decoded video data based on the syntax elements obtained (e.g., extracted) from the bitstream.

The NAL units of the bitstream may include coded slice NAL units. As part of decoding the bitstream, entropy decoding unit 150 may extract and entropy decode syntax elements from the coded slice NAL units. Each of the coded slices may include a slice header and slice data. The slice header may contain syntax elements pertaining to a slice. The syntax elements in the slice header may include a syntax element that identifies a PPS associated with a picture that contains the slice.

In addition to decoding syntax elements from the bitstream, video decoder 30 may perform a reconstruction operation on a non-partitioned CU. To perform the reconstruction operation on a non-partitioned CU, video decoder 30 may perform a reconstruction operation on each TU of the CU. By performing the reconstruction operation for each TU of the CU, video decoder 30 may reconstruct residual blocks of the CU.

As part of performing a reconstruction operation on a TU of a CU, inverse quantization unit 154 may inverse quantize, i.e., de-quantize, coefficient blocks associated with the TU. Inverse quantization unit 154 may use a QP value associated with the CU of the TU to determine a degree of quantization and, likewise, a degree of inverse quantization for inverse quantization unit 154 to apply. That is, the compression ratio, i.e., the ratio of the number of bits used to represent original sequence and the compressed one, may be controlled by adjusting the value of the QP used when quantizing transform coefficients. The compression ratio may also depend on the method of entropy coding employed.

After inverse quantization unit 154 inverse quantizes a coefficient block, inverse transform processing unit 156 may apply one or more inverse transforms to the coefficient block in order to generate a residual block associated with the TU. For example, inverse transform processing unit 156 may apply an inverse DCT, an inverse integer transform, an inverse Karhunen-Loeve transform (KLT), an inverse rotational transform, an inverse directional transform, or another inverse transform to the coefficient block.

If a PU is encoded using intra prediction, intra-prediction processing unit 166 may perform intra prediction to generate predictive blocks for the PU. Intra-prediction processing unit 166 may use an intra prediction mode to generate the predictive luma, Cb and Cr blocks for the PU based on the prediction blocks of spatially-neighboring PUs. Intra-prediction processing unit 166 may determine the intra prediction mode for the PU based on one or more syntax elements decoded from the bitstream.

Prediction processing unit 152 may construct a first reference picture list (RefPicList0) and a second reference picture list (RefPicList) based on syntax elements extracted from the bitstream. Furthermore, if a PU is encoded using inter prediction, entropy decoding unit 150 may extract motion information for the PU. Motion compensation unit 164 may determine, based on the motion information of the PU, one or more reference regions for the PU. Motion compensation unit 164 may generate, based on samples blocks at the one or more reference blocks for the PU, predictive luma, Cb and Cr blocks for the PU.

Reconstruction unit 158 may use the luma, Cb and Cr transform blocks associated with TUs of a CU and the predictive luma, Cb and Cr blocks of the PUs of the CU, i.e., either intra-prediction data or inter-prediction data, as applicable, to reconstruct the luma, Cb and Cr coding blocks of the CU. For example, reconstruction unit 158 may add samples of the luma, Cb and Cr transform blocks to corresponding samples of the predictive luma, Cb and Cr blocks to reconstruct the luma, Cb and Cr coding blocks of the CU.

Filter unit 160 may perform a deblocking operation to reduce blocking artifacts associated with the luma, Cb and Cr coding blocks of the CU. Video decoder 30 may store the luma, Cb and Cr coding blocks of the CU in decoded picture buffer 162. Decoded picture buffer 162 may provide reference pictures for subsequent motion compensation, intra prediction, and presentation on a display device, such as display device 32 of FIG. 1. For instance, video decoder 30 may perform, based on the luma, Cb and Cr blocks in decoded picture buffer 162, intra prediction or inter prediction operations on PUs of other CUs. In this way, video decoder 30 may extract, from the bitstream, transform coefficient levels of the significant luma coefficient block, inverse quantize the transform coefficient levels, apply a transform to the transform coefficient levels to generate a transform block, generate, based at least in part on the transform block, a coding block, and output the coding block for display.

In accordance with various examples of this disclosure, video decoder 30 may be configured to perform palette-based coding. Palette-based decoding unit 165, for example, may perform palette-based decoding when a palette-based decoding mode is selected, e.g., for a CU or PU. For example, palette-based decoding unit 165 may be configure to generate a palette having entries indicating pixel values, receive information associating at least some positions of a block of video data with entries in the palette, select pixel values in the palette based on the information, and reconstruct pixel values of the block based on the selected pixel values. Although various functions are described as being performed by palette-based decoding unit 165, some or all of such functions may be performed by other processing units, or a combination of different processing units.

According to aspects of this disclosure, video decoder 30 may be configured to determining whether to disable filtering of reconstructed palette coded blocks by filter unit 160 prior to storing the reconstructed blocks in decoded picture buffer 162. For example, video decoder 30 may disable deblocking filtering and/or SAO filtering of palette coded blocks by filter unit 160. Conventionally, palette coded blocks were treated the same as inter-coded blocks and, as such, filtering was automatically applied to the reconstructed blocks prior to being stored in a decoded picture buffer or output for display. According to the disclosed techniques, video decoder 30 may determine that a reconstructed block is a palette coded block and, based on that determination, disable filtering by filter unit 160 prior to storing the block in decoded picture buffer 162. The techniques for determining filtering of palette coded blocks are described in more detail below with respect to FIGS. 4 and 5.

Figure 4:
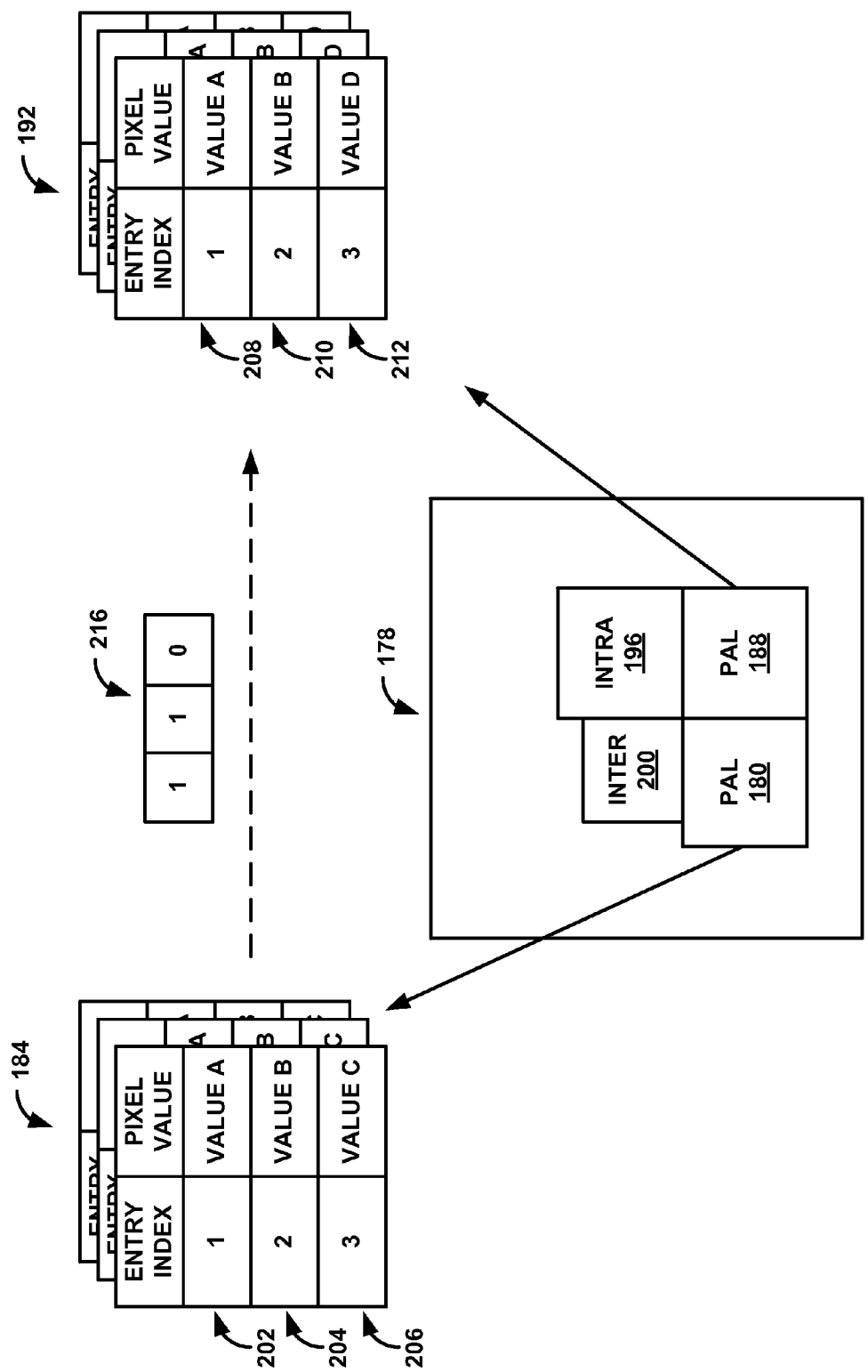
FIG. 4 is a conceptual diagram illustrating an example of determining palette entries for palette-based video coding, consistent with techniques of this disclosure.

FIG. 4 is a conceptual diagram illustrating an example of determining a palette for coding video data, consistent with techniques of this disclosure. The example of FIG. 4 includes a picture 178 having a first coding unit (CU) 180 coded as a palette (PAL) coded block associated with first palettes 184, and a second CU 188 coded a palette (PAL) coded block associated with second palettes 192. Picture 178 also includes intra block 196 coded with an intra-prediction coding mode and inter block 200 that is coded with an inter-prediction coding mode. The techniques of FIG. 4 are described in the context of video encoder 20 (FIG. 1 and FIG. 2) and video decoder 30 (FIG. 1 and FIG. 3) and with respect to the HEVC standard for purposes of explanation. However, it should be understood that the techniques of this disclosure are not limited in this way, and may be applied by other video coding processors and/or devices in other video coding processes and/or standards.

In general, a palette refers to a number of pixel values that are dominant and/or representative for a CU currently being coded, CU 188 in the example of FIG. 4. First palettes 184 and second palettes 192 are shown as including multiple palettes. In some examples, according to aspects of this disclosure, a video coder (such as video encoder 20 or video decoder 30) may code palettes separately for each color component of a CU. For example, video encoder 20 may encode a palette for a luma (Y) component of a CU, another palette for a chroma (U) component of the CU, and yet another palette for the chroma (V) component of the CU. In this example, entries of the Y palette may represent Y values of pixels of the CU, entries of the U palette may represent U values of pixels of the CU, and entries of the V palette may represent V values of pixels of the CU.

In other examples, video encoder 20 may encode a single palette for all color components of a CU. In this example, video encoder 20 may encode a palette having an i-th entry that is a triple value, including Yi, Ui, and Vi. In this case, the palette includes values for each of the components of the pixels. Accordingly, the representation of palettes 184 and 192 as a set of palettes having multiple individual palettes is merely one example and not intended to be limiting.

In the example of FIG. 4, first palettes 184 includes three palette entries 202, 204, 206 having index value 1, index value 2, and index value 3, respectively. Palette entries 202, 204, 206 relate the index values to pixel values (i.e., color values) including pixel value A, pixel value B, and pixel value C, respectively. As described herein, rather than coding the actual pixel values of first CU 180, a video coder (such as video encoder 20 or video decoder 30) may use palette-based coding to code the pixels of the block using the index values 1, 2, 3. That is, for each pixel position of first CU 180, video encoder 20 may encode an index value for the pixel, where the index value corresponds to a palette entry that indicates a pixel value for the pixel in one or more of first palettes 184. Video decoder 30 may obtain the index values from a bitstream and reconstruct the pixel values using the index values and one or more of first palettes 184. Thus, first palettes 184 are transmitted by video encoder 20 in an encoded video data bitstream for use by video decoder 30 in palette-based decoding.

In some examples, video encoder 20 and video decoder 30 may determine second palettes 192 based on first palettes 184. For example, video encoder 20 and/or video decoder 30 may locate one or more blocks from which the predictive palettes, in this example, first palettes 184, are determined. In some examples, such as the example illustrated in FIG. 4, video encoder 20 and/or video decoder 30 may locate the previously coded CU such as a left neighboring CU (first CU 180) when determining a predictive palette for second CU 188.

In the example of FIG. 4, second palettes 192 include three palette entries 208, 210, 212 having index value 1, index value 2, and index value 3, respectively. Palette entries 208, 210, 212 relate the index values to pixel values including pixel value A, pixel value B, and pixel value D, respectively. In this example, video encoder 20 may code one or more syntax elements indicating which entries of first palettes 184 are included in second palettes 192. In the example of FIG. 4, the one or more syntax elements are illustrated as a vector 216. Vector 216 has a number of associated bins (or binary bits) with each bin indicating whether the palette predictor associated with that bin is used to predict an entry of the current palette. For example, vector 216 indicates that the first two entries of first palettes 184 (202 and 204) are included in second palettes 192 (a value of "1" in the first two bins of vector 216), while the third entry of first palettes 184 is not included in second palettes 192 (a value of "0" in the third bin of vector 216). In the example of FIG. 4, the vector is a Boolean vector.

The techniques of this disclosure are directed toward improvements in the derivation of palettes for palette-based coding. More specifically, the techniques of this disclosure include modifying a palette size and palette entries of a palette at video encoder 20, and determining whether to disable filtering of palette coded blocks at video encoder 20 and/or video decoder 30. In the example of FIG. 4, video encoder 20 may perform the palette modification techniques of this disclosure to derive first palettes 184. First palettes 184 are then transmitted by video encoder 20 in an encoded video data bitstream for use by video decoder 30 in palette-based decoding. Although primarily described in this disclosure with respect to video encoder 20, in other examples the palette modification techniques of this disclosure may be performed by both video encoder 20 and video decoder 30. In that case, for example, video decoder 30 may separately derive first palettes 184, or may modify first palettes 184 that are transmitted by video encoder 20 in accordance with the techniques of this disclosure. While described with respect to first palettes 184 for purposes of explanation, the techniques may be performed using a variety of other palettes of other configurations and/or sizes. In the palette-based coding mode, as described in JCTVC-P0035, JCTVC-P0108, and JCTVC-P0198 (cited above), video encoder 20 may derive a palette for a palette coded block, e.g., CU 180, using a pixel value clustering method. Using a proper algorithm to derive the palette, e.g., first palettes 184, is one of the key procedures in palette mode coding. For example, video encoder 20 may derive a histogram including a plurality of entries with each entry including a respective color value and a respective quantity of pixels of the block that map to the color value. As one example, video encoder 20 may determine a histogram H for a block of video data. Histogram H may be represented by $H=\{(v_i, f_i), i=\{0, 1, 2, \ldots, M\}\}$ where M+1 is the number of different pixel values in the current block, $v_i$ is a pixel value of the ith pixel, and $f_i$ is the number of occurrences of $v_i$ (i.e., how many pixels in the current block have pixel value $v_i$). In some examples, each of the plurality of entries of the histogram represents a quantity of pixels that have the same pixel value. In some examples, each of the plurality of entries of the histogram represents a quantity of pixels that, when quantized, have the same pixel value.

After deriving the histogram, video encoder 20 may initialize a palette P to be empty, i.e., P=φ, initialize an index value of the palette to zero, i.e. idx-0, and/or initialize an index value of the histogram to zero, i.e., set j=0, Video encoder 20 then sorts the entries of the histogram in descending order based on the respective quantity of pixels for each of the entries such that a first entry of the histogram includes the color value having a highest quantity of pixels relative to the other color values. For example, video encoder 20 may sort histogram H according to the descending order of $f_i$, such that pixel values having more occurrences in the current block are placed nearing the front of the histogram. The sorted histogram may be represented by $H_o=\{(u_i, f_i), i=\{0, 1, 2, \ldots, M\}, f_i \geq f_{i+1}\}$.

Video encoder 20 may then determine the palette size and the palette entries of the palette for the current block based on the entries of the histogram. For example, video encoder 20 may insert a first entry $(j, u_j)$ of the sorted histogram into the palette, i.e. $P=P \cup \{(idx, u_j)\}$. Video encoder 20 may then increment the palette index, i.e.. idx=idx+1, and increment the histogram index, i.e., j=j+1. Video encoder 20 may determine whether or not the pixel value corresponding to the next entry in the sorted histogram is within the neighborhood of any of the pixel values already included in the palette. For instance, video encoder 20 may determine a distance value that corresponds to a difference between the pixel value corresponding to the next entry in the sorted histogram and one or more of the pixel values already included in the palette,. If the determined difference value is greater than or equal to a threshold, i.e., Distance($u_j$, x)≥Thresh, video encoder 20 may insert a new entry into the palette that indicates the pixel value corresponding to the next entry in the sorted histogram. If the determined difference value does not satisfy the threshold, i.e., Distance($u_j$, x)<Thresh, video encoder 20 determines that the pixel value corresponding to the next entry in the sorted histogram is within the neighborhood of a pixel value already included in the palette and will not add a new entry into the palette. Video encoder 20 may then increment the histogram index, i.e., j=j+1

In some examples, video encoder 20 may stop determining the palette (e.g., stop adding entries to the palette) if one or more conditions satisfy one or more respective thresholds. As one example, video encoder 20 may stop determining the palette when the size of the palette is greater than a predefined value. As another example, video encoder 20 may stop determining the palette when the value of the palette index equals the number of different pixel values in the current block, i.e., idx=M. As another example, video encoder 20 may stop determining the palette when the value of the histogram index equals the number of different pixel values in the current block, i.e., j=M.

In accordance with the techniques of this disclosure, after determining the palette size and the palette entries for the palette, video encoder 20 may determine whether to modify at least one of the palette size or one or more of the palette entries for the palette based at least partially on rate-distortion costs. In this way, the techniques enable video encoder 20 to determine whether to modify the palette size and palette entries originally determined for the palette, For example, video encoder 20 may determine whether to keep or remove a given index value that corresponds to a given one of the palette entries, e.g., index value 1 of entry 202 in palettes 184, based on a rate-distortion cost of encoding a pixel of CU 180 using index value 1 or encoding the same pixel of CU 180 as an escape pixel (i.e., directly quantizing the pixel value and transmitting the quantized value for the pixel), in this example, determining to remove index value 1 and corresponding palette entry 202 from palettes 184 reduces the palette size, e.g., palettes 184 would only include entries 204 and 206.

In one example, video encoder 20 calculates a first rate-distortion cost for encoding a pixel of the current block using a given index value that corresponds to a given one of the palette entries that indicates a color value for the pixel, e.g., RD(idx_coding, t) is calculated for each palette index t when the pixels mapped to palette index t are coded with the index t. Video encoder 20 then calculates a second rate-distortion cost for encoding the same pixel of the current block as an escape pixel, e.g., RD(escape_coding, t), is calculated for each palette index t when the pixels belonging to palette index t are coded with the escape mode including encoding a special index value and directly quantizing the pixel values and transmitting the quantized values for the pixels.

Video encoder 20 then compares the first and second rate-distortion cost calculations to determine whether to keep or remove the given index value and the corresponding one of the palette entries of the palette. For example, if the first rate-distortion cost is higher than the second rate-distortion cost, video encoder 20 may remove the given index and the corresponding one of the palette entries from the palette, e.g., index value 1 of entry 202 from palettes 184. In this example, the color value A of entry 202 likely occurs infrequently in CU 180, i.e., has a low quantity of associated pixels of CU 180, relative to the other color values in palettes 184.

In some examples, video encoder 20 may perform this keep or remove determination for each palette entry 202, 204, 206 of palettes 184, but, in many instances, only the "low occurrence" palette entries that have a small quantity of associated pixels are likely to be removed. This is because the cost of coding a larger palette that includes the low occurrence palette entries and the cost of coding pixels using the high index values that correspond to the low occurrence palette entries is likely to be higher than coding the few pixels as escape pixels. In this way, the techniques enable video encoder 20 to remove one or more palette entries from the originally derived palette that indicate color values that occur infrequently in the current block to be encoded.

As another example, video encoder 20 may determine whether to merge a given index value that corresponds to a given one of the palette entries, e.g., index value 1 of entry 202 in palettes 184, into a neighboring index value that corresponds to a neighboring one of the palette entries, e.g., index value 2 of entry 204 in palettes 184, based on a rate-distortion cost of encoding a pixel of CU 180 using index value 1 or using neighboring index value 2. In one instance, neighboring index value 2 of entry 204 may be a nearest index value in terms of a smallest Euclidean distance from given index value 1 of entry 202. In another instance, neighboring index value 2 of entry 204 may be a nearest index value in terms of index order with respect to given index value 1 of entry 202. In this example, determining to merge the given index value 1 and corresponding palette entry 202 of palettes 184 into neighboring index value 2 and corresponding neighboring palette entry 204 of palettes 184 reduces the palette size, e.g., palettes 184 would only include entries 204 and 206.

In one example, video encoder 20 calculates a first rate-distortion cost for encoding a pixel of the current block using the given index value that corresponds to the given one of the palette entries that indicates a first color value for the pixel, e.g., RD(separate_coding, t) is calculated for each palette index t when the pixels mapped to palette index t are coded with the index t. Video encoder 20 then calculates a second rate-distortion cost for encoding the same pixel of the current block using the neighboring index value that corresponds to the neighboring one of the palette entries that indicates a second color value for the pixel, e.g., RD(merged_coding, t->m) is calculated for palette index t when the pixels mapped to palette index t are coded with neighboring palette index m.

Video encoder 20 then compares the first and second rate-distortion cost calculations to determine whether to merge the given index value and the corresponding one of the palette entries of the palette into the neighboring index value and the neighboring one of the palette entries of the palette. For example, if the first rate-distortion cost is higher than the second rate-distortion cost, video encoder 20 may merge the given index and the corresponding one of the palette entries, e.g., index value 1 of entry 202, into the neighboring index value and the neighboring one of the palette entries, e.g., index value 2 of entry 204. In this example, the first color value A of given palette entry 202 and the second color value B of neighboring palette entry 204 are likely substantially similar values. For example, the first color value A and the second color value B, when quantized, may be the same color value.

In some examples, merging given index value 1 of entry 202 into neighboring index value 2 of entry 204 may result in entry 202 being removed from palettes 184 and any pixels that previously mapped to first color value A of given entry 202 being mapped to second color value B of neighboring entry 204. In other examples, merging given index value 1 of entry 202 into neighboring index value 2 of entry 204 may result in both given entry 202 and neighboring entry 204 being removed from palettes 184, and a single new palette entry being added to palettes 184. The new palette entry may indicate a color value that is an average or some other combination of first color value A of given entry 202 and second color value B of neighboring entry 204. In this example, any pixels that previously mapped to entry 202 or entry 204 will be mapped to the new palette entry.

In some examples, video encoder 20 may perform this merge determination for each palette entry 202, 204, 206 of palettes 184, but, in many instances, only the "very similar" palette entries that indicate substantially similar color values (i.e., color values that may be quantized to the same color value) are likely to be merged. This is because the cost of coding a larger palette that includes the very similar palette entries and the cost of coding pixels using the separate index values that correspond to each of the very similar palette entries is likely to be higher than coding the pixels using a single, merged index value. In this way, the techniques enable video encoder 20 to merge one or more palette entries in the originally derived palette that indicate substantially similar color values in the current block to be encoded.

As a further example, video encoder 20 may determine whether to modify one or more of the palette entries of the palette, e.g., entries 202, 204, 206 in palettes 184 based on a representative palette determined using a k-means clustering method. Video encoder 20 may use the k-means clustering method to calculate palette entries of a representative palette for each palette index, where a number of iterations of the k-means clustering method is threshold based. For example, for each of the palette entries of the originally derived palette, e.g., entries 202, 204, 206 in palettes 184, video encoder 20 calculates an average pixel value of one or more pixels of CU 180 that are mapped to the respective color value, e.g., color value A, B, C, indicated by the respective one of the palette entries, e.g., entries 202, 204, 206. Video encoder 20 then determines the representative palette for CU 180 including representative palette entries indicating the respective average pixel values.

In some cases, video encoder 20 may perform another, second iteration of the k-means clustering method, including mapping or classifying the pixels of CU block 180 using the representative palette and again calculating the average pixel value for each of the representative palette entries, in order to derive a final version of the representative palette. In other cases, video encoder 20 may perform a number of iterations of the k-means clustering method that is determined by a threshold value. The threshold value may be set according to an acceptable computational cost at video encoder 20.

After determining the representative palette for the block of video data that includes the representative palette entries indicating the respective average pixel values, video encoder 20 performs a search for a nearest pixel value of the block mapped to each of the palette indexes, and the nearest pixel value is regarded as the color value in the final palette for the respective one of the palette indexes. For example, for a given one of the representative palette entries of the representative palette, video encoder 20 determines a pixel value of one of the pixels mapped to the given one of the representative palette entries that is nearest the average pixel value indicated by the given one of the representative palette entries. Based on the nearest pixel value being different than the color value indicated by a corresponding one of the palette entries of the palette, video encoder 20 selects the nearest pixel value as a final color value indicated by the given one of the palette entries of the palette.

In this way, video encoder 20 determines to modify the given one of the palette entries, e.g., palette entry 202 in original palettes 184, based on the nearest pixel value to the average pixel value in the representative palette being different than the color value A indicated by given palette entry 202 in originally derived palettes 184. If the nearest pixel value determined based on the representative palette and the color value A indicated by the given palette entry 202 in the originally derived palettes 184 are the same, then video encoder 20 does not need to modify the given palette entry 202 in original palettes 184.

Additionally, in accordance with the techniques of this disclosure, video encoder 20 and/or video decoder 30 may determine whether to disable filtering of palette coded blocks, e.g., CU 180 or CU 188. For example, video encoder 20 and/or video decoder 30 may disable filtering, such as deblocking tittering and/or sample adaptive offset (SAO) filtering, of reconstructed versions of palette coded CU 180 prior to storage in a decoded picture buffer for later use as a reference block or, in the case of video decoder 30, output for display to a user. In some examples, video encoder 20 and/or video decoder 30 may only disable deblocking filtering of CU 180. In other examples, video encoder 20 and/or video decoder 30 may disable SAO filtering of CU 180. In still other examples, video encoder 20 and/or video decoder 30 may disable both deblocking filtering and SAC) filter, and any other types of filtering, for CU 180.

Conventionally, palette coded blocks were treated the same as inter-coded blocks for which filtering is automatically applied to the reconstructed blocks prior to being stored in a decoded picture buffer or output for display. According to the disclosed techniques, video encoder 20 and/or video decoder 30 may apply no filtering to palette coded blocks, e.g., CU 180 and CU 188, but may continue to apply filtering to inter-coded blocks, e.g., inter block 200. For example, video encoder 20 and/or video decoder 30 may determine that a reconstructed block is a palette coded block, e.g., CU 180 or CU 188, and disable filtering of the reconstructed block based on the determination of the palette-based coding mode. In some cases, the techniques may add a conditional statement or check to the CU-level syntax such that if the current CU is a palette coded block, then filtering is disabled for the current CU.

While the techniques of FIG. 4 are described in the context of CUs (HEVC), it should be understood that the techniques may also be applied to prediction units (PUs) or in other video coding processes and/or standards.

Figure 5:
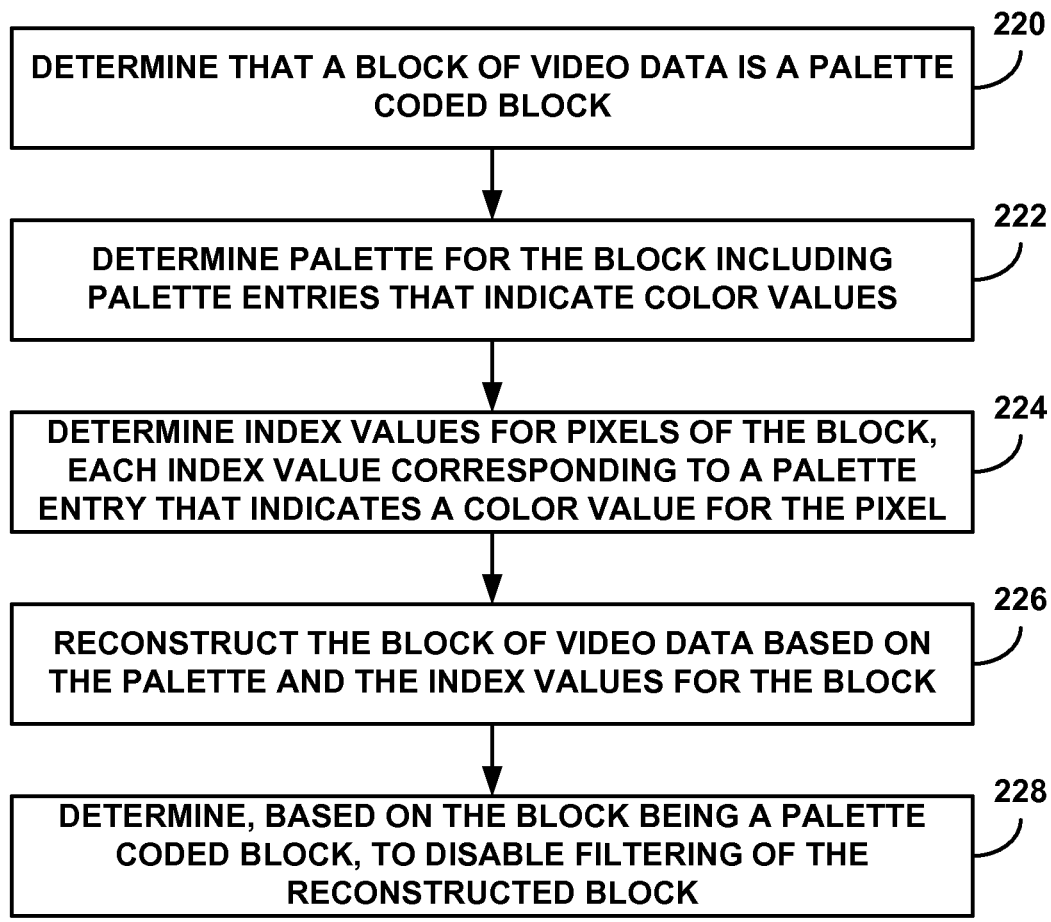
FIG. 5 is a flowchart illustrating an example operation of a video coder determining filtering of palette coded blocks, in accordance with techniques of this disclosure.

FIG. 5 is a flowchart illustrating an example operation of a video coder determining filtering of palette coded blocks, in according with techniques of this disclosure. The example operation illustrated in FIG. 5 may be performed by either video encoder 20 from FIG. 2 or video decoder 30 from FIG. 3.

The example operation of FIG. 5 will first be described with respect to video decoder 30. Video decoder 30 receives an encoded bitstream from a video encoder, such as video encoder 20, that includes encoded blocks of video data for at least one picture and one or more syntax elements associated with the video data. Video decoder 30 determines that a current block of video data to be decoded is a palette coded block (220). In some examples, video decoder 30 may receive at least one syntax element (e.g., a flag) in the bitstream that indicates whether or not each block of the video data is a palette coded block. In other examples, video decoder 30 may receive one or more syntax elements indicating a type of coding used to code each block of the video data, e.g., whether each block is a palette coded block, an inter-coded block, or an intra-coded block, etc.

When the current block to be decoded is a palette coded block, palette-based decoding unit 165 of video decoder 30 determines a palette for the current block where the palette includes one or more palette entries that indicate one or more respective color values (222). As described in more detail above, the respective color values included in the palette may be the major color values that occur most frequently in the current block. Palette-based decoding unit 165 may determine the palette according to a palette size and palette entries received in the encoded bitstream, Palette-based decoding unit 165 then determines index values for one or more pixels of the current block received in the encoded bitstream, each of the index values corresponding to one of the palette entries that indicates a color value for one of the pixels of the current block (224).

Video decoder 30 reconstructs the current block of video data based on the determined palette and the determined index values for the current block (226). For example, video decoder 30 may map the determined index values to entries of the palette to reconstruct the pixel values of the current block. Video decoder 30 may then store the video data of the reconstructed block in decoded picture buffer 162 and subsequently output the video data of the reconstructed block for display.

Conventionally, palette coded blocks were treated the same as inter-coded blocks and, as such, filtering was automatically applied to the reconstructed blocks prior to being stored in a decoded picture buffer or output for display. According to the disclosed techniques, video decoder 30 determines, based on the current block being a palette coded block, to disable filtering of the reconstructed block prior to storing or outputting the reconstructed block (228). In some examples, video decoder 30 may only disable deblocking filtering of the current palette coded block by filter unit 160 of video decoder 30. In other examples, video decoder 30 may disable SAO filtering of the current palette coded block. In still other examples, video decoder 30 may disable all types of filtering performed by filter unit 160 for the current palette coded block.

The example operation of FIG. 5 will now be described with respect to video encoder 20. Video encoder 20 determines that a current block of video data is to be encoded as a palette coded block (220). In some examples, video encoder 20 may signal at least one syntax element (e.g., a flag) in an encoded bitstream that indicates whether or not each block of the video data is a palette coded block. In other examples, video encoder 20 may signal one or more syntax elements in the encoded bitstream indicating a type of coding used to code each block of the video data, e.g., whether each block is a palette coded block, an inter-coded block, or an intra-coded block, etc.

When the current block is to be encoded as a palette coded block, palette-based encoding unit 122 of video encoder 20 determines a palette for the current block where the palette includes one or more palette entries that indicate one or more respective color values (222). As described in more detail above, the respective color values included in the palette may be the major color values that occur most frequently in the current block. Palette-based encoding unit 122 may determine a palette size and palette entries of the palette using a pixel value clustering method, such as the clustering method described in more detail above with respect to FIG. 4. In accordance with techniques of this disclosure, palette-based encoding unit 122 may determine whether to modify at least one of the palette size or one or more of the palette entries for the palette based at least partially on rate-distortion costs. This modification determination is described in more detail below with respect to FIG. 6.

After determining the palette, palette-based encoding unit 122 determines index values for one or more pixels of the current block, each of the index values corresponding to one of the palette entries that indicates a color value for one of the pixels of the current block (224). For example, video encoder 20 may encode the current block of video data by locating entries in the palette that represent colors of one or more of the pixels of the current block, and encoding the block with index values that indicate the entries in the palette. Video encoder 20 may signal the palette and the index values for the current palette coded block in the encoded bitstream to a video decoder, such as video decoder 30.

Video encoder 20 then reconstructs the current block of video data based on the determined palette and the determined index values for the current block in a decoding loop (226). For example, video encoder 20 may map the index values to entries of the palette to reconstruct the pixel values of the current block. Video encoder 20 may then store the video data of the reconstructed block in decoded picture buffer 116. According to the disclosed techniques, video encoder 20 determines, based on the current block being a palette coded block, to disable filtering of the reconstructed block prior to storing the reconstructed block (228). In some examples, video encoder 20 may only disable deblocking filtering of the current palette coded block by filter unit 114 of video encoder 20. In other examples, video encoder 20 may disable SAO filtering of the current palette coded block. In still other examples, video encoder 20 may disable all types of filtering performed by filter unit 114 for the current palette coded block.

Figure 6:
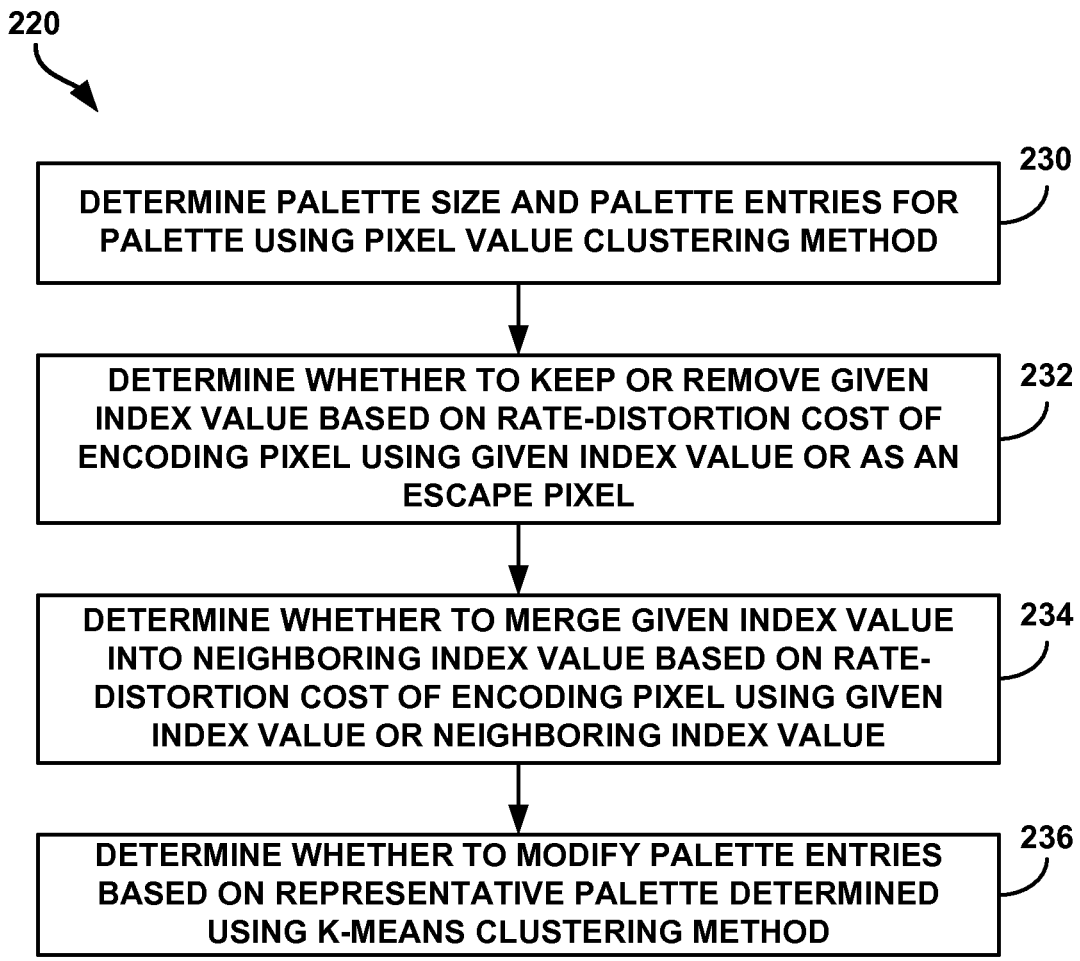
FIG. 6 is a flowchart illustrating an example operation of a video encoder determining a palette for a palette coded block of video data, in accordance with techniques of this disclosure.

FIG. 6 is a flowchart illustrating an example operation of a video encoder determining a palette for a palette coded block of video data, e.g., step 220 from FIG. 5, in according with techniques of this disclosure. The example operation illustrated in FIG. 6 is described with respect to video encoder 20 from FIG. 2.

As described above, when a current block of video data is to be encoded as a palette coded block, palette-based encoding unit 122 of video encoder 20 determines a palette for the current block where the palette includes one or more palette entries that indicate one or more respective color values and that correspond to respective index values. To determine the palette, palette-based encoding unit 122 of video encoder 20 first determines a palette size and the palette entries of the palette using a pixel value clustering method (230). For example, as described in more detail above with respect to FIG. 4, for the current block of video data, palette-based encoding unit 122 may determine a histogram including a plurality of entries with each entry including a respective color value and a respective quantity of pixels of the block that map to the color value, sort the entries of the histogram in descending order based on the respective quantity of pixels for each of the entries such that a first entry of the histogram includes the color value having a highest quantity of pixels relative to the other color values, and determining the palette size and the palette entries of the palette based on the entries of the histogram.

In accordance with the techniques of this disclosure, after determining the palette size and the palette entries for the palette, palette-based encoding unit 122 may determine whether to modify at least one of the palette size or one or more of the palette entries for the palette based at least partially on rate-distortion costs. For example, palette-based encoding unit 122 may determine whether to keep or remove a given index value that corresponds to a given one of the palette entries of the palette based on a rate-distortion cost of encoding a pixel of the block using the given index value or as an escape pixel (232). In this example, determining to remove the given index value and the corresponding one of the palette entries from the palette reduces the palette size.

In some cases, palette-based encoding unit 122 may perform a rate-distortion cost comparison to determine whether to remove or keep the given index value as follows. Palette-based encoding unit 122 calculates a first rate-distortion cost for encoding a pixel of the current block using a given index value that corresponds to a given one of the palette entries that indicates a color value for the pixel. Palette-based encoding unit 122 then calculates a second rate-distortion cost for encoding the same pixel of the current block as an escape pixel, including encoding a special index value and a quantized pixel value for the pixel. Palette-based encoding unit 122 determines whether to keep or remove the given index value and the corresponding one of the palette entries of the palette based on a comparison of the first and second rate-distortion cost calculations. For example, if the first rate-distortion cost is higher than the second rate-distortion cost, palette-based encoder unit 122 may remove the given index and the corresponding one of the palette entries from the palette. In this example, the color value indicated by the given one of the palette entries likely occurs infrequently in the current block, i.e., has a low quantity of associated pixels of the current block, relative to the other color values in the palette.

In another example, palette-based encoding unit 122 may determine whether to merge a given index value that corresponds to a given one of the palette entries of the palette into a neighboring index value that corresponds to a neighboring one of the palette entries of the palette based on a rate-distortion cost of encoding a pixel of the block using the given index value or using the neighboring index value (234). In one example, the neighboring index value may be a nearest index value in terms of a smallest Euclidean distance from the given index value. In another example, the neighboring index value may be a nearest index value in terms of index order with respect to the given index value. In this example, determining to merge the given index value and the corresponding one of the palette entries of the palette into the neighboring index value and the neighboring one of the palette entries of the palette reduces the palette size.

In some cases, palette-based encoding unit 122 may perform a rate-distortion cost comparison to determine whether to merge the given index value as follows. Palette-based encoding unit 122 calculates a first rate-distortion cost for encoding a pixel of the current block using the given index value that corresponds to the given one of the palette entries that indicates a first color value for the pixel. Palette-based encoding unit 122 then calculates a second rate-distortion cost for encoding the same pixel of the current block using the neighboring index value that corresponds to the neighboring one of the palette entries that indicates a second color value for the pixel. Palette-based encoding unit 122 determines whether to merge the given index value and the corresponding one of the palette entries of the palette into the neighboring index value and the neighboring one of the palette entries of the palette based on a comparison of the first and second rate-distortion cost calculations. For example, if the first rate-distortion cost is higher than the second rate-distortion cost, palette-based encoder unit 122 may merge the given index and the corresponding one of the palette entries into the neighboring index value and the neighboring one of the palette entries. In this example, the first color value indicated by the given one of the palette entries and the second color value indicated by the neighboring one of the palette entries are likely substantially similar values. For example, the first color value and the second color value, when quantized, may be the same color value.

In a further example, palette-based encoding unit 122 may determine whether to modify one or more of the palette entries of the palette based on a representative palette determined using a k-means clustering method (236). For example, as described in more detail above with respect to FIG. 4, for each of the palette entries of the originally derived palette, palette-based encoding unit 122 calculates an average pixel value of one or more pixels of the block that are mapped to the respective color value indicated by the respective one of the palette entries. Palette-based encoding unit 122 then determines the representative palette for the block of the video data including representative palette entries indicating the respective average pixel values. In some cases, palette-based encoding unit 122 may perform a number of iterations of the k-means clustering method that is determined by a threshold value.

After determining the representative palette for the block of video data that includes the representative palette entries indicating the respective average pixel values, palette-based encoding unit 122 determines, for a given one of the representative palette entries of the representative palette, a pixel value of one of the pixels mapped to the given one of the representative palette entries that is nearest the average pixel value indicated by the given one of the representative palette entries. Based on the nearest pixel value being different than the color value indicated by a corresponding one of the palette entries of the palette, palette-based encoding unit 122 selects the nearest pixel value as a final color value indicated by the given one of the palette entries of the palette. In this way, palette-based encoding unit 122 determines to modify the given one or the palette entries based a comparison of the nearest pixel value to the average pixel value in the representative palette and the color value indicated by the given one of the palette entries in the originally derived palette.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially. In addition, while certain aspects of this disclosure are described as being performed by a single module or unit for purposes of clarity, it should be understood that the techniques of this disclosure may be performed by a combination of units or modules associated with a video coder.

Certain aspects of this disclosure have been described with respect to the developing HEVC standard for purposes of illustration. However, the techniques described in this disclosure may be useful for other video coding processes, including other standard or proprietary video coding processes not yet developed.

The techniques described above may be performed by video encoder 20 (FIGS. 1 and 2) and/or video decoder 30 (FIGS. 1 and 3), both of which may be generally referred to as a video coder. Likewise, video coding may refer to video encoding or video decoding, as applicable.

While particular combinations of various aspects of the techniques are described above, these combinations are provided merely to illustrate examples of the techniques described in this disclosure. Accordingly, the techniques of this disclosure should not be limited to these example combinations and may encompass any conceivable combination of the various aspects of the techniques described in this disclosure.

In one Of more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of processing video data, the method comprising:
   determining that a block of video data is a palette coded block;
   determining a palette for the block including one or more palette entries that indicate one or more respective color values;
   determining index values for one or more pixels of the block, each of the index values corresponding to one of the palette entries that indicates a color value for one of the pixels of the block;
   reconstructing the block of video data based on the palette and the index values for the block; and
   determining, based on the block being a palette coded block, to disable filtering of the reconstructed block.

2. The method of claim 1, wherein determining to disable filtering of the reconstructed block comprises disabling at least one of deblocking filtering of the reconstructed block or sample adaptive offset (SAO) filtering of the reconstructed block.

3. The method of claim 1, wherein reconstructing the block comprises reconstructing the block of the video data by a video decoder, the method further comprising based on the filtering being disabled, at least one of outputting the video data by the video decoder for display or storing the video data by the video decoder in a decoded picture buffer without filtering the reconstructed block of the video data.

4. The method of claim 1, wherein reconstructing the block comprises reconstructing the block of the video data by a video encoder, the method further comprising, based on the filtering being disabled, storing the video data by the video encoder in a decoded picture buffer without filtering the reconstructed block of the video data.

5. The method of claim 1, wherein determining the palette for the block comprises:
   determining, by a video encoder, a palette size and the palette entries for the palette using a pixel value clustering method; and
   determining whether to modify at least one of the palette size or one or more of the palette entries for the palette based at least partially on rate-distortion costs.

6. The method of claim 5, wherein determining whether to modify the palette size comprises determining whether to keep or remove a given index value that corresponds to a given one of the palette entries of the palette, wherein removing the given index value and the corresponding one of the palette entries of the palette reduces the palette size.

7. The method of claim 6, further comprising:
   calculating a first rate-distortion cost for encoding at least one pixel of the block using the given index value that corresponds to the given one of the palette entries that indicates a color value for the at least one pixel;
   calculating a second rate-distortion cost for encoding the at least one pixel of the block as an escape pixel, including encoding a quantized pixel value for the at least one pixel; and
   determining whether to keep or remove the given index value and the corresponding one of the palette entries of the palette based on a comparison of the first and second rate-distortion cost calculations.

8. The method of claim 5, wherein determining whether to modify the palette size comprises determining whether to merge a given index value that corresponds to a given one of the palette entries of the palette into a neighboring index value that corresponds to a neighboring one of the palette entries of the palette, wherein merging the given index value and the corresponding one of the palette entries of the palette into the neighboring index value and the neighboring one of the palette entries of the palette reduces the palette size.

9. The method of claim 8, wherein the neighboring index value is one of a nearest index value in terms of a smallest Euclidean distance from the given index value, or a nearest index value in terms of index order with respect to the given index value.

10. The method of claim 8, further comprising:
    calculating a first rate-distortion cost for encoding at least one pixel of the block using the given index value that corresponds to the given one of the palette entries that indicates a first color value for the at least one pixel;
    calculating a second rate-distortion cost for encoding the at least one pixel of the block using the neighboring index value that corresponds to the neighboring one of the palette entries that indicates a second color value for the at least pixel, wherein the second color value is similar to the first color value; and determining whether to merge the given index value and the corresponding one of the palette entries of the palette into the neighboring index value and the neighboring one of the palette entries of the palette based on a comparison of the first and second rate-distortion cost calculations.

11. The method of claim 5, wherein determining whether to modify one or more of the palette entries of the palette comprises:

determining a representative palette for the block of the video data using a k-means clustering method, the representative palette including representative palette entries indicating respective average pixel values;

determining, for a given one of the representative palette entries of the representative palette, a pixel value of one of the pixels mapped to the given one of the representative palette entries that is nearest the average pixel value indicated by the given one of the representative palette entries; and based on the nearest pixel value being different than the color value indicated by a corresponding one of the palette entries of the palette, selecting the nearest pixel value as a final color value indicated by the given one of the palette entries of the palette.

12. The method of claim 11, wherein determining the representative palette using the k-means clustering method comprises:

calculating, for each of the palette entries of the palette, an average pixel value of one or more pixels of the block that are mapped to the respective color value indicated by the respective one of the palette entries; and determining the representative palette for the block of the video data including the representative palette entries indicating the respective average pixel values, wherein a number of iterations of the k-means clustering method is determined by a threshold value.

13. The method of claim 5, wherein determining the palette size and the palette entries for the palette using the pixel value clustering method comprises:

determining, for the block of the video data, a histogram including a plurality of entries, each entry including a respective color value and a respective quantity of pixels of the block that map to the color value;

sorting the entries of the histogram in descending order based on the respective quantity of pixels for each of the entries such that a first entry of the histogram includes the color value having a highest quantity of pixels relative to the other color values; and determining the palette size and the palette entries of the palette based on the entries of the histogram.

14. A video processing device comprising:

a memory configured to store video data; and one or more processors in communication with the memory and configured to:

determine that a block of video data is a palette coded block;

determine a palette for the block including one or more palette entries that indicate one or more respective color values;

determine index values for one or more pixels of the block, each of the index values corresponding to one of the palette entries that indicates a color value for one of the pixels of the block;

reconstruct the block of video data based on the palette and the index values for the block; and determine, based on the block being a palette coded block, to disable filtering of the reconstructed block.

15. The device of claim 14, wherein the one or more processors are configured to disable at least one of deblocking filtering of the reconstructed block or sample adaptive offset (SAO) filtering of the reconstructed block.

16. The device of claim 14, wherein the device comprises a video decoder, and wherein the one or more processors of the video decoder are configured to, based on the filtering being disabled, reconstruct the block of the video data, and at least one of output the video data for display or store the video data in a decoded picture buffer without filtering the reconstructed block of the video data.

17. The device of claim 14, wherein the device comprises a video encoder, and wherein the one or more processors of the video encoder are configured to, based on the filtering being disabled, reconstruct the block of the video data, and store the video data in a decoded picture buffer without filtering the reconstructed block of the video data.

18. The device of claim 14, wherein the device comprises a video encoder, and wherein, to determine the palette for the block, the one or more processors of the video encoder are configured to:

determine a palette size and the palette entries for the palette using a pixel value clustering method; and determine whether to modify at least one of the palette size or one or more of the palette entries for the palette based at least partially on rate-distortion costs.

19. The device of claim 18, wherein, to determine whether to modify the palette size, the one or more processors are configured to determine whether to keep or remove a given index value that corresponds to a given one of the palette entries of the palette, wherein removing the given index value and the corresponding one of the palette entries of the palette reduces the palette size.

20. The device of claim 19, wherein the one or more processors are configured to:

calculate a first rate-distortion cost for encoding at least one pixel of the block using the given index value that corresponds to the given one of the palette entries that indicates a color value for the at least one pixel;

calculate a second rate-distortion cost for encoding the at least one pixel of the block as an escape pixel, including encoding a quantized pixel value for the at least one pixel; and determine whether to keep or remove the given index value and the corresponding one of the palette entries of the palette based on a comparison of the first and second rate-distortion cost calculations.

21. The device of claim 18, wherein, to determine whether to modify the palette size, the one or more processors are configured to determine whether to merge a given index value that corresponds to a given one of the palette entries of the palette into a neighboring index value that corresponds to a neighboring one of the palette entries of the palette, wherein merging the given index value and the corresponding one of the palette entries of the palette into the neighboring index value and the neighboring one of the palette entries of the palette reduces the palette size.

22. The device of claim 21, wherein the neighboring index value is one of a nearest index value in terms of a smallest Euclidean distance from the given index value, or a nearest index value in terms of index order with respect to the given index value.

23. The device of claim 21, wherein the one or more processors are configured to:
- calculate a first rate-distortion cost for encoding at least one pixel of the block using the given index value that corresponds to the given one of the palette entries that indicates a first color value for the at least one pixel;
- calculate a second rate-distortion cost for encoding the at least one pixel of the block using the neighboring index value that corresponds to the neighboring one of the palette entries that indicates a second color value for the at least pixel, wherein the second color value is similar to the first color value; and
- determine whether to merge the given index value and the corresponding one of the palette entries of the palette into the neighboring index value and the neighboring one of the palette entries of the palette based on a comparison of the first and second rate-distortion cost calculations.

24. The device of claim 18, wherein, to determine whether to modify one or more of the palette entries of the palette, the one or more processors are configured to:
- determine a representative palette for the block of the video data using a k-means clustering method, the representative palette including representative palette entries indicating respective average pixel values;
- determine, for a given one of the representative palette entries of the representative palette, a pixel value of one of the pixels mapped to the given one of the representative palette entries that is nearest the average pixel value indicated by the given one of the representative palette entries; and
- based on the nearest pixel value being different than the color value indicated by a corresponding given one of the palette entries of the palette, select the nearest pixel value as a final color value indicated by the given one of the palette entries of the palette.

25. The device of claim 24, wherein, to determine the representative palette using the k-means clustering method, the one or more processors are configured to:
- calculate, for each of the palette entries of the palette, an average pixel value of one or more pixels of the block that are mapped to the respective color value indicated by the respective one of the palette entries; and
- determine the representative palette for the block of the video data including the representative palette entries indicating the respective average pixel values, wherein a number of iterations of the k-means clustering method is determined by a threshold value.

26. The device of claim 18, wherein, to determine the palette size and the palette entries for the palette using the pixel value clustering method, the one or more processors are configured to:
- determine, for the block of the video data, a histogram including a plurality of entries, each entry including a respective color value and a respective quantity of pixels of the block that map to the color value;
- sort the entries of the histogram in descending order based on the respective quantity of pixels for each of the entries such that a first entry of the histogram includes the color value having a highest quantity of pixels relative to the other color values; and
- determine the palette size and the palette entries of the palette based on the entries of the histogram.

27. The device of claim 14, wherein the device comprises at least one of:
- an integrated circuit;
- a microprocessor; or
- a wireless communication device.

28. A video processing device comprising:
- means for determining that a block of video data is a palette coded block;
- means for determining a palette for the block including one or more palette entries that indicate one or more respective color values;
- means for determining index values for one or more pixels of the block, each of the index values corresponding to one of the palette entries that indicates a color value for one of the pixels of the block;
- means for reconstructing the block of video data based on the palette and the index values for the block; and
- means for determining, based on the block being a palette coded block, to disable filtering of the reconstructed block.

29. A non-transitory computer-readable medium having stored thereon instructions for processing video data that, when executed, cause one or more processors to:
- determine that a block of video data is a palette coded block;
- determine a palette for the block including one or more palette entries that indicate one or more respective color values;
- determine index values for one or more pixels of the block, each of the index values corresponding to one of the palette entries that indicates a color value for one of the pixels of the block;
- reconstruct the block of video data based on the palette and the index values for the block; and
- determine, based on the block being a palette coded block, to disable filtering of the reconstructed block.

* * * * *